(12) United States Patent
Cameron et al.

(10) Patent No.: US 6,898,692 B1
(45) Date of Patent: May 24, 2005

(54) METHOD AND APPARATUS FOR SIMD PROCESSING USING MULTIPLE QUEUES

(75) Inventors: Ken Cameron, Bristol (GB); Eamon O'Dea, Bristol (GB)

(73) Assignee: ClearSpeed Technology plc, Bristol (GB)

( * ) Notice: Subject to any disclaimer, the term of this patent is extended or adjusted under 35 U.S.C. 154(b) by 420 days.

(21) Appl. No.: 10/019,188

(22) PCT Filed: Jun. 28, 2000

(86) PCT No.: PCT/GB00/02474

§ 371 (c)(1),
(2), (4) Date: Jun. 20, 2002

(87) PCT Pub. No.: WO01/01352

PCT Pub. Date: Jan. 4, 2001

(30) Foreign Application Priority Data

| Jun. 28, 1999 | (GB) | ............................................. 9915060 |
| Mar. 22, 2000 | (GB) | ............................................. 0006986 |
| Jun. 27, 2000 | (GB) | ............................................. 0015678 |
| Jun. 27, 2000 | (GB) | ............................................. 0015766 |

(51) Int. Cl.$^7$ .............................................. G06F 9/28
(52) U.S. Cl. ........................ 712/22; 712/215; 712/214; 712/206; 710/52; 710/54
(58) Field of Search ...................... 710/52, 54; 712/22, 712/206, 214, 215

(56) References Cited

U.S. PATENT DOCUMENTS

| 5,307,449 | A | | 4/1994 | Kelley et al. |
| 5,363,475 | A | | 11/1994 | Baker et al. |
| 5,379,428 | A | * | 1/1995 | Belo ........................... 718/103 |
| 5,404,428 | A | * | 4/1995 | Wu .............................. 345/619 |
| 5,583,974 | A | | 12/1996 | Winner et al. |
| 5,808,690 | A | | 9/1998 | Rich |
| 5,842,031 | A | | 11/1998 | Barker et al. |
| 6,112,019 | A | * | 8/2000 | Chamdani et al. ........... 712/214 |
| 6,782,470 | B1 | * | 8/2004 | Berg et al. ................... 712/225 |

FOREIGN PATENT DOCUMENTS

| JP | 06162226 A | * | 6/1994 |
| WO | WO97/06512 | | 2/1997 |

* cited by examiner

*Primary Examiner*—B. James Peikari
(74) *Attorney, Agent, or Firm*—Potomac Patent Group PLLC

(57) ABSTRACT

A method of processing data relating to graphical primitives to be displayed on a display device using region-based SIMD multiprocessor architecture, has the shading and blending operations deferred until rasterization of the available graphical primitive data is completed. For example, the method may comprise the steps of: a) defining a data queue having a predetermined number of locations therein; b) receiving fragment information belonging to an image to be displayed by the pixel; c) determining whether the fragment information belongs to an opaque image or to a blended image; d) if the fragment information relates to a blended image, storing the fragment information on the next available location in the queue; e) if the fragment information relates to an opaque image, clearing the locations of the queue and storing the fragment information in the first location in the queue; f) repeating steps b) to e) for new fragment information until fragment information is stored in all the locations in the data queue or until no further fragment information is available; and g) processing in turn fragment information stored in the locations of the queue to produce respective pixel display values.

24 Claims, 25 Drawing Sheets

METHOD AND APPARATUS FOR SIMD PROCESSING USING MULTIPLE QUEUES

The present invention relates to processing graphical data and in particular to methods and apparatus for calculating pixel data for display on a display device having a plurality of pixels.

BACKGROUND OF THE INVENTION

Graphical images are conventionally displayed on display devices which include a plurality of picture elements, or pixels. One such device is illustrated in FIG. 1 of the accompanying drawings. The display device 1 is made up of a plurality (for example 640×480, 800×600, to 1600×1200) of pixels (picture elements) 3 which are used to make up the image display on the screen as is well known. In order to display an image on the screen the colour value of each pixel must be calculated for each frame of the image to be displayed. The pixel information is typically stored in a "frame buffer" of the display device. Calculation of pixel colour values is known as "shading" and is advantageously performed by a dedicated graphics processing system. The use of such a dedicated graphics processing system in combination with a host system enables the processing power of the host system to be more effectively utilised processing applications software. The application software typically determines the geometry of the images to be shown on the display device and the graphics system takes geometrical information and calculates the actual pixel values for display on the device 1 from that information.

Commonly, the graphics processing system receives information from the host application in the form of information data regarding graphical primitives to be displayed. A graphical primitive is a basic graphical element which can be used to make up complex images. For example, a common graphical primitive is a triangle and a number of different shaped and sized triangles can be used to make up a larger more complex shape. The primitive data includes information regarding, the extent, colour, texture and other attributes of the primitive. Any amount of primitive information can be used. For example, simply colour and extent information may be sufficient for the application or primitive concerned. Visual depth information, ie the relative position, of the primitive can also be included. In the following examples, primitives having a high visual depth value are considered to be closer the viewer, ie more visible, than those primitives having lower visual depth value. Such a convention is arbitrary, and could be replaced by any other suitable convention.

FIG. 2 illustrates in side view, and FIG. 3 illustrates in front view, the display of primitives P1, P2 and P3 on the pixels 3 of the display device 1. Primitive P1 is the rearmost primitive, having a visual depth P1d which is lower than the visual depths of the other primitives. Primitive P3 is the frontmost primitive. As can be seen, the primitives overlap one another, and so the graphics processing system must calculate, for each pixel, which of the primitives is displayed at that pixel.

In the following examples, three pixels 3a, 3b and 3c will be used illustrate the graphical processing of the primitive data.

In a graphical processing system having a single processor, a primitive analysed so that a pixel covered by the primitive can be identified. A "fragment" of the primitive data is determined for that pixel, and is then processed to determine the colour to be displayed for the pixel. When one fragment has been processed, a further fragment can be identified and processed.

The graphics processor receives fragment information which contains data indicating the colour, texture and blending characteristics of the primitive concerned at a particular pixel.

A "shading" process is then used to process the fragment information in order to determine the actual pixel data which is to be written to the frame buffer of the display device for display thereon. The shading process results in the determination of the colour of the pixel from the fragment information. This may involve a texture look-up operation to determine the texture characteristics to be displayed at the pixel. A texture look-up involves a memory access step to retrieve the texel, or texture element, for the pixel. For opaque primitives, the colour information is supplied to the frame buffer where it overwrites the current value to give a new value for display.

The frame buffer contents can be displayed immediately, or could be displayed at an arbitrary time in the future (for example using multiple frame buffers for the device), and any suitable scheme can be used for the display device concerned.

FIG. 4 shows the final frame buffer values for the primitives arrangements shown in FIGS. 2 and 3. Pixel 3a will display the properties of primitive P1, pixel 3b will display the properties of primitive P2, and pixel 3c will display the properties of primitive P3.

A development of such a system uses a region-based processing scheme including a plurality of processors. As illustrated in FIG. 1, the pixels 3 of the display device 1 are grouped in to a number of regions, for example region 5. The region size is usually defined by the number of processors in the multiple processor system. One particular processing architecture could be a single instruction multiple data (SIMD) processing architecture. In a region based architecture, the primitives are sorted to determine which regions of the display include which primitives and are then subjected to "rasterisation" to break the primitives into fragments. The fragment information is stored for each primitive until all of the primitives have been rasterised. Usually, only the most recently determined fragment information is retained for each pixel. A shading process is then used to determine the pixel data to be stored in the frame buffer for display. Such a scheme has the advantage that the shading process can be used a minimized number of times by shading multiple pixels at the same time (using one processor per pixel) and by waiting until a high proportion of pixels are ready to be shaded. Such a scheme is known as "deferred shading" because the shading process is carried out after the rasterisation process has been completed.

Such a scheme works well when all of the primitives are opaque since deferring the shading operation enables large memory accesses (i.e. texture look-ups) to be deferred and performed in parallel. The result for opaque primitives will be as shown in FIG. 4.

A technique which can be used to provide transparent or partly transparent primitives is known as "blending". In a blending process, the current pixel data stored in the frame buffer is combined with newly calculated pixel data relating to a new primitive. The combination is performed in a manner defined by the blending algorithm in accordance with a so-called α-value which indicates the amount of blending that is to be achieved, for example an α-value of 0.5 indicates that the result of the blend is to be half existing colour and half new colour. Blending occurs after the shading process. In the single processor case blending is performed immediately following the shading process for each pixel. The pixel data is blended in the order in which the associates primitives are output from the host system.

FIG. 5 illustrates the calculated frame buffer values for the primitives of FIGS. 2 and 3, where primitives P1 and P2 are blended, and P3 is opaque. Pixel 3a displays a blend of primitive P1 and the background pixel 3b displays a blend of P1, P2 and the background, and 3c displays only P3.

In the region based architecture, it is not practical to defer blending with the deferred shading process because of the requirement to store large amounts of data relating to all of the primitives occurring at a pixel regardless of whether those primitives are visible or not. This is necessary because a blended primitive can have an effect on the final values of the pixel. In such a case, the shading and blending processes must be carried out for a pixel as soon as a blended primitive is encountered. This results in low utilisation of a multi-processor design, since, on average, a single blended primitive is likely to cover only a small number of pixels and so the shading and blending processes must be carried out even though only a small number of the available processors have the required data. In addition, if shading and blending were to be performed for each primitive, many operations would be unnecessary due to overlapping primitives at a pixel.

Deferred shading for images including blended primitives has not been implemented for region based multiple processor graphics processing architectures, because of these problems.

It is therefore desirable to provide a graphics processing system which can defer blending and shading operations in order to provide higher performance and faster computation time.

Furthermore, conventional data processing techniques process data serially through different tasks. For example see FIG. 38 of the accompanying drawings which illustrates a conventional process in which data items (Data #1) are generated, for example by a result from a calculation or from a memory fetch operation, and are then processed by first task (task A). Task A results in new data (Data #2) for processing by a second task (task B) to produce result data® data). Conventionally these tasks need to be repeated for each new data item for processing.

In a single instruction multiple data (SIMD) architecture a number of processing elements act to process respective data items according to a single instruction at any one time. Such processing is illustrated in FIG. 39 of the accompanying drawings, which show processing by n elements.

With a single instruction stream it is necessary for all the n processing elements to perform the same tasks, although each processing element has it's own data: this is SIMD. Every processing element generates a new item of data (Data#1 0–Data#1 n). Each respective processing element then performs a respective Task A on its respective Data#1.

On completion of Task A, by each of the processing elements, some percentage (between 0% and 100%) of the processing elements will have a respective valid data item on which to perform a respective Task B. Since all the processing elements must perform the same Task at the same time, those without valid data are performing no useful work, and the set of processing elements, as a whole, are not working at full utilisation, i.e. maximum efficiency.

As the fraction of processing elements producing valid data, as a result of Task A, as input data (Data#2) to Task B decreases, the efficiency of the whole array of processing elements also decreases. Furthermore, as the "cost" of Task B increases, i.e. number of cycles* required to perform the task, the utilisation of the whole of the processing flow decreases.

(*—by way of an example, Fixed Point Processing requires approx 10 cycles for a typical 4 byte integer and Floating Point Processing requires approx 100 cycles for a 4 byte floating point number.)

Clearly the flow through tasks A and B can be extended with further Tasks, i.e. Task C, Task D etc. The output data from Task B feeds into Task C and clearly if Task B eliminates the data, Task c will suffer under-utilisation, and so on. Further Tasks can be cascaded in this fashion, with utilisation rapidly decreasing through each step as data items are eliminated.

SUMMARY OF THE PRESENT INVENTION

According to one aspect of the present invention, there is provided a method of processing data relating to graphical primitives to be displayed on a display device using a region-based multi-processor architecture, wherein shading and blending operations are deferred until rasterisation of the available graphical primitive data is completed.

According to another aspect of the present invention, there is provided a data processing apparatus for processing data for display on a display device, the apparatus comprising a plurality of processing elements operable to rasterise all available graphical primitive data into fragment data, and then to perform shading and blending processes on the fragment data in parallel for respective pixels of the display device.

According to another aspect of the present invention there is provided a A method of processing data representing images to be displayed on a device having a plurality of pixels, the method comprising, for each pixel of the device:

a) defining a data queue having a predetermined number of locations therein;

b) receiving fragment information belonging to an image to be displayed by the pixel;

c) determining whether the fragment information belongs to an opaque image or to a blended image;

d) if the fragment information relates to a blended image, storing the fragment information on the next available location in the queue;

e) if the fragment information relates to an opaque image, clearing the locations of the queue and storing the fragment information in the first location in the queue;

f) repeating steps b) to e) for new fragment information, until fragment information is stored in all the locations in the data queue or until no further fragment information is available; and g) processing in turn fragment information stored in the locations of the queue to produce respective pixel display values.

According to another aspect of the present invention, there is provided a data processing apparatus for processing data relating to images to be displayed on a display device having a plurality of pixels, the apparatus comprising:

rasterisation means connected to receive graphical primitive data and operable to produce fragment information from the graphical primitive data for each pixel of the graphical primitive;

storage means operable to store the fragment information for a plurality of pixels; and processor means connected to receive fragment information, and operable to produce pixel display data from the fragment information, wherein the storage means defines, for each pixel, a data queue having a plurality of locations, the fragment information for a pixel being stored in respective locations of the data queue, and wherein the apparatus comprises control means operable to analyse the fragment information, and to discard all queue locations for a pixel and store new fragment information in the first location of the queue if the new fragment information relates to an opaque primitive, and to store new fragment information in the next available location in the data queue if the new fragment information relates to a blended primitive.

According to another aspect of the present invention, there is provided a method of processing data representing images to be displayed on a device having a plurality of pixels, the method comprising, for at least one pixel of the device:

a) defining a data queue having a predetermined number of locations therein;
b) defining an opaque depth value indicating the depth value of the most visible opaque primitive to be displayed at the pixel;
c) defining the transparent depth value indicating the depth value of the most visible transparent primitive to be displayed at the pixel;
d) receiving fragment information belonging to an image to be displayed by the pixel;
e) determining whether the fragment information relates to a visible image with respect to the opaque depth value, and discarding the fragment information if it does not relate to such a visible image;
f) determining whether the fragment information belongs to an opaque image or to a transparent image;
g) if the fragment information relates to an opaque image:
  i) updating the opaque depth value to equal the fragment depth value;
  ii) determining whether the fragment information is visible with reference to the transparent depth value; and
  iii) if the fragment is visible with reference to the transparent depth value, clearing the queue locations and updating the transparent depth value to equal the fragment depth value;
h) if the fragment relates to a transparent image, and if the fragment is visible with respect to the transparent depth value, updating the transparent depth value to equal the fragment depth value;
i) storing the fragment data in the next available queue location;
j) repeating steps d) to i) for new fragment information, until fragment information is stored in all of the locations of a data queue or until no further fragment information is available;
k) sorting the entries in the queue in order of depth value; and
l) processing in turn fragment information stored in the locations of the queue to produce respective pixel display values.

According to another aspect of the present invention, there is provided a method of processing data representing images to be displayed on a device having a plurality of pixels, the method comprising, for at least one pixel of the device:

a) defining a data queue having a predetermined number of locations therein, and assigning one of the locations for storing only data relating to opaque images;
b) defining an opaque depth value indicating the depth value of the most visible opaque primitive to be displayed at the pixel;
c) defining the transparent depth value indicating the depth value of the most visible transparent primitive to be displayed at the pixel;
d) receiving fragment information belonging to an image to be displayed by the pixel;
e) determining whether the fragment information relates to a visible image with respect to the opaque depth value, and discarding the fragment information if it does not relate to such a visible image;
f) determining whether the fragment information belongs to an opaque image or to a transparent image;
g) if the fragment information relates to an opaque image:
  i) updating the opaque depth value to equal the fragment depth value;
  ii) determining whether the fragment information is visible with reference to the transparent depth value;
  iii) if the fragment is visible with reference to the transparent depth value, clearing the queue locations and updating the transparent depth value to equal the fragment depth value; and
  iv) storing the fragment data in the opaque queue location;
h) if the fragment relates to a transparent image:
  i) if the fragment is visible with respect to the transparent depth value, updating the transparent depth value to equal the fragment depth value; and
  ii) storing the fragment data in the next available queue location;
i) repeating steps d) to h) for new fragment information, until fragment information is stored in all of the locations of a data queue or until no further fragment information is available;
k) sorting the entries in the queue in order of depth value; and
l) processing in turn fragment information stored in the locations of the queue to produce respective pixel display values.

According to another aspect of the present invention there is provided a method of processing data representing images to be displayed on a device having a plurality of pixels, the method comprising, for at least one pixel of the device:

a) defining a data queue having a predetermined number of locations therein, and assigning one of the locations for storing only data relating to opaque images;
b) defining an opaque depth value indicating the depth value of the most visible opaque primitive to be displayed at the pixel;
c) receiving fragment information belonging to an image to be displayed by the pixel, the fragment information including fragment depth information;
d) determining whether the fragment information relates to a visible image with respect to the opaque depth value, and discarding the fragment information if it does not relate to such a visible image;
e) storing the fragment information in the queue at a location corresponding to the fragment depth information;
f) determining whether the fragment information belongs to an opaque image or to a transparent image;
g) if the fragment information relates to an opaque image:
  i) clearing the queue location relating to fragment depths behind the fragment depth; and ii) updating the opaque depth value to equal the fragment depth;

h) repeating steps c) to g) until all of the locations if a data queue contain fragment information, or until no further fragment information is available;

i) processing in turn fragment information stored in the locations of the queue to produce respective pixel display values.

According to another aspect of the present invention there is provided a method of processing data using a SIMD computer architecture having a plurality of processing elements for processing data, the method comprising: for each processing element defining at least one processing task, being operable to process input data to form task output data, defining a data queue for receiving data input to the task, and processing the data stored in the queue in a first in first out manner, when a predetermined condition is met.

Preferably, the predetermined condition is that either no further data items are available or a predetermined queue status is met.

Preferably, the predetermined queue status is that at least one of the queues is full.

Alternatively, the predetermined queue status is that all of the data queues have at least one data item.

Alternatively, the predetermined queue status is that a proportion of the queues have at least one data item.

According to another aspect, there is provided a data processing apparatus for processing data items in a single instruction multiple data (SIMD) processing architecture having a plurality of processing elements for processing data, the apparatus comprising:

a data queue corresponding to each processing element, the data queue having a plurality of queue positions;

means for receiving a new data item for at least one processing element in the architecture;

means for storing the data item in the next available queue position in the queue defined for the processing element concerned;

means for receiving and storing further data items until a predetermined condition is met; and means for processing the first data item in each queue using the associated processing element, all of the processing element operating according to the same single instruction, thereby producing respective result data items.

According to another aspect of the present invention, there is provided a method of processing data using a SIMD computer architecture having a plurality of processing elements for processing data, the method comprising: for each processing element defining at least one processing task, being operable to process input data to form task output data, defining a data stack for receiving data input to the task, and processing the data stored in the stack in a first in last out manner, when a predetermined condition is met.

Preferably, the predetermined condition is that either no further data items are available or a predetermined stack status is met.

Preferably, the predetermined stack status is that at least one of the stacks is full.

Alternatively, the predetermined stack status is that all of the data stacks have at least one data item.

Alternatively, the predetermined stack status is that a proportion of the stacks have at least one data item.

According to another aspect of the invention, there is provided a data processing apparatus for processing items in a single instruction multiple data (SIMD) processing architecture having a plurality of processing elements for processing data, the apparatus comprising:

a data stack corresponding to each processing element, each stack having a plurality of stack positions;

means for receiving a new data item for at least one processing element in the architecture;

means for storing the data item in the next available stack position in the stack corresponding to the processing element concerned;

means for receiving and storing further data items until a predetermined condition is met; and means for processing the last data item in each stack using the associated processing element, all of the processing elements operating according to the same single instruction, thereby producing respective result data items.

DESCRIPTION OF THE PREFERRED EMBODIMENT

Figure 6:
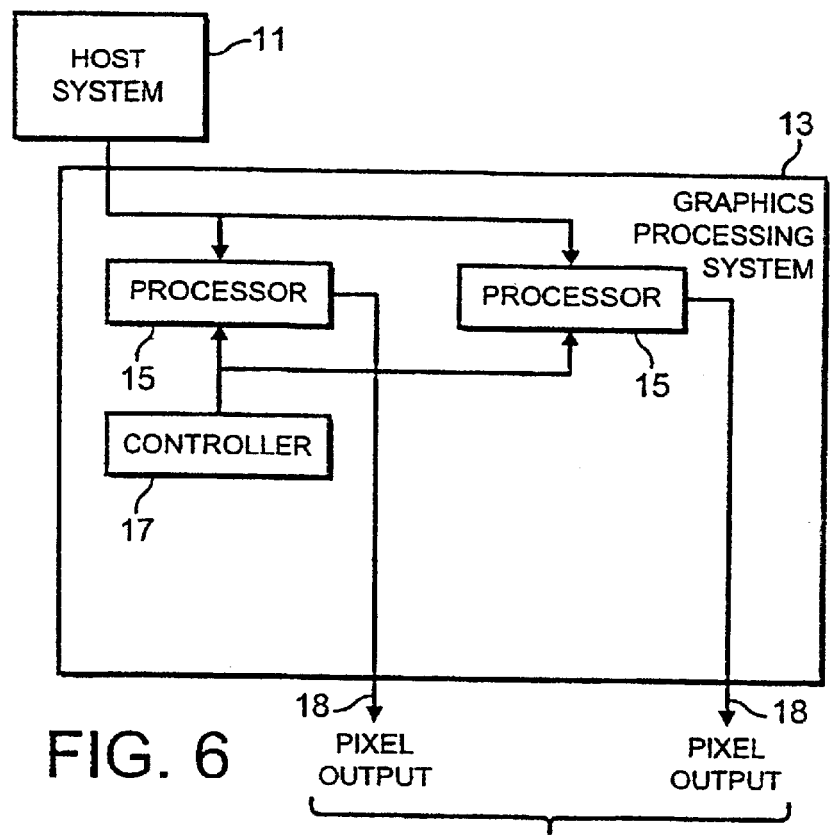
FIG. 6 illustrates a graphics processing system.
Figure 7:
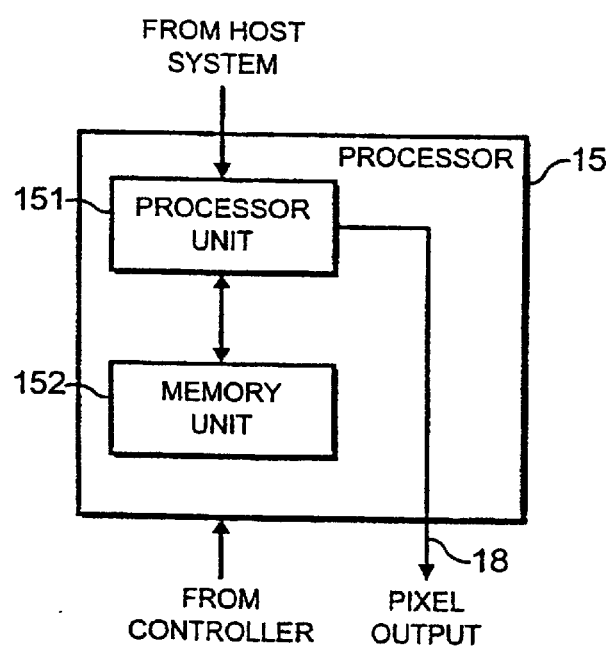
FIG. 7 illustrates part of the system of FIG. 6.

FIG. 6 of the accompanying drawings illustrates a graphics processing system including a host system 11 connected to communicate with a graphics processing core 13. The graphics processing core 13 includes processor elements 15 and a controller 17. The processor elements 15 receive graphical primitive information from the host system 11 and control signals from the controller 17. The processor elements 15 operate to process the graphical primitive data in accordance with instructions from the controller 17 and to output information relating to properties of a respective pixel. FIG. 7 illustrates one of the processor elements 15 of FIG. 6 in more detail. The processor element 15 includes a processor unit 151, and a memory unit 152. The processor unit 151 may, for example, include an arithmetic logic unit and operates to process the data supplied by the host system, and the memory unit 152 is used as a local data storage area by the processor unit 151.

Figure 1:
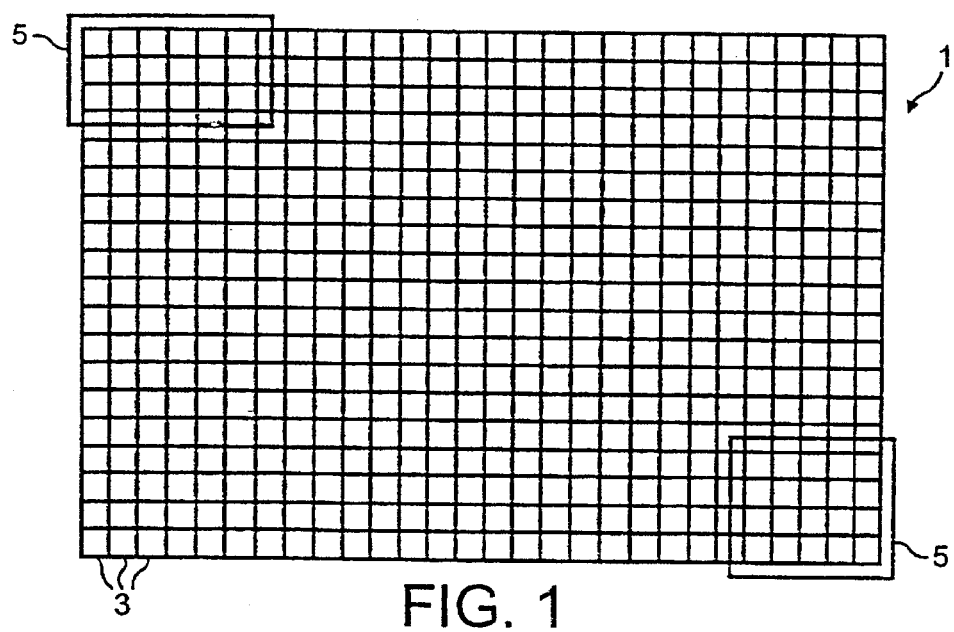
FIG. 1 is a schematic diagram illustrating a display device.
Figure 2:
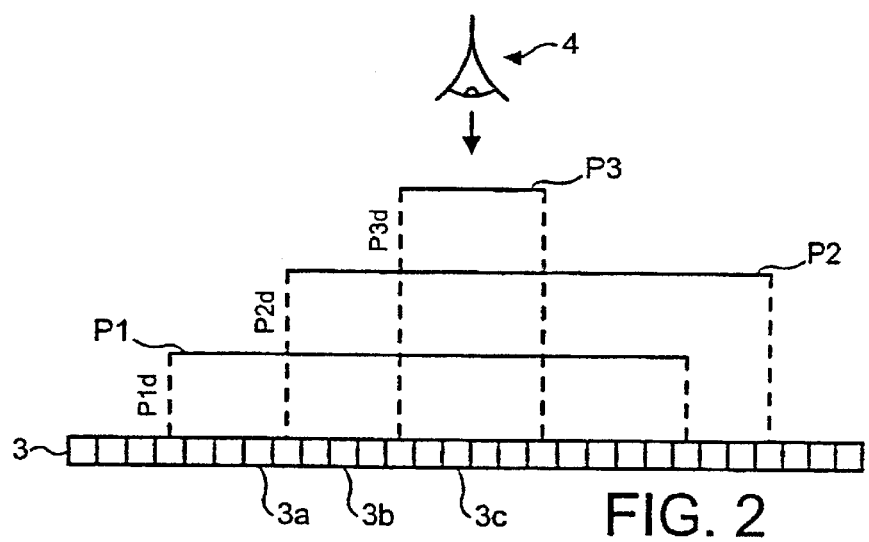
FIG. 2 and FIG. 3 are schematic diagrams illustrating graphical primitives and the device of FIG. 1.

A method of processing graphical data embodying one aspect of the present invention will now be described with reference to FIGS. 6 to 12. As illustrated in FIG. 10 a respective data queue 19a, 19b, 19c is defined for each pixel 3a, 3b, 3c (FIG. 2). Each queue has a plurality of locations and acts as a first-in-first-out queue. Each queue is preferably defined within the processor memory unit 152, although could be implemented as a dedicated FIFO buffer or other appropriate device.

Graphical primitive information is received from the host system 11 a single primitive at a time. A rasterisation and sorting process identifies the pixels that are included in the primitive and divides the primitive into fragments, one fragment per pixel. When all of the primitives have been rasterised and sorted, the pixel attribute calculation can begin. Such rasterisation and sorting processes are well known in the art.

Figure 8:
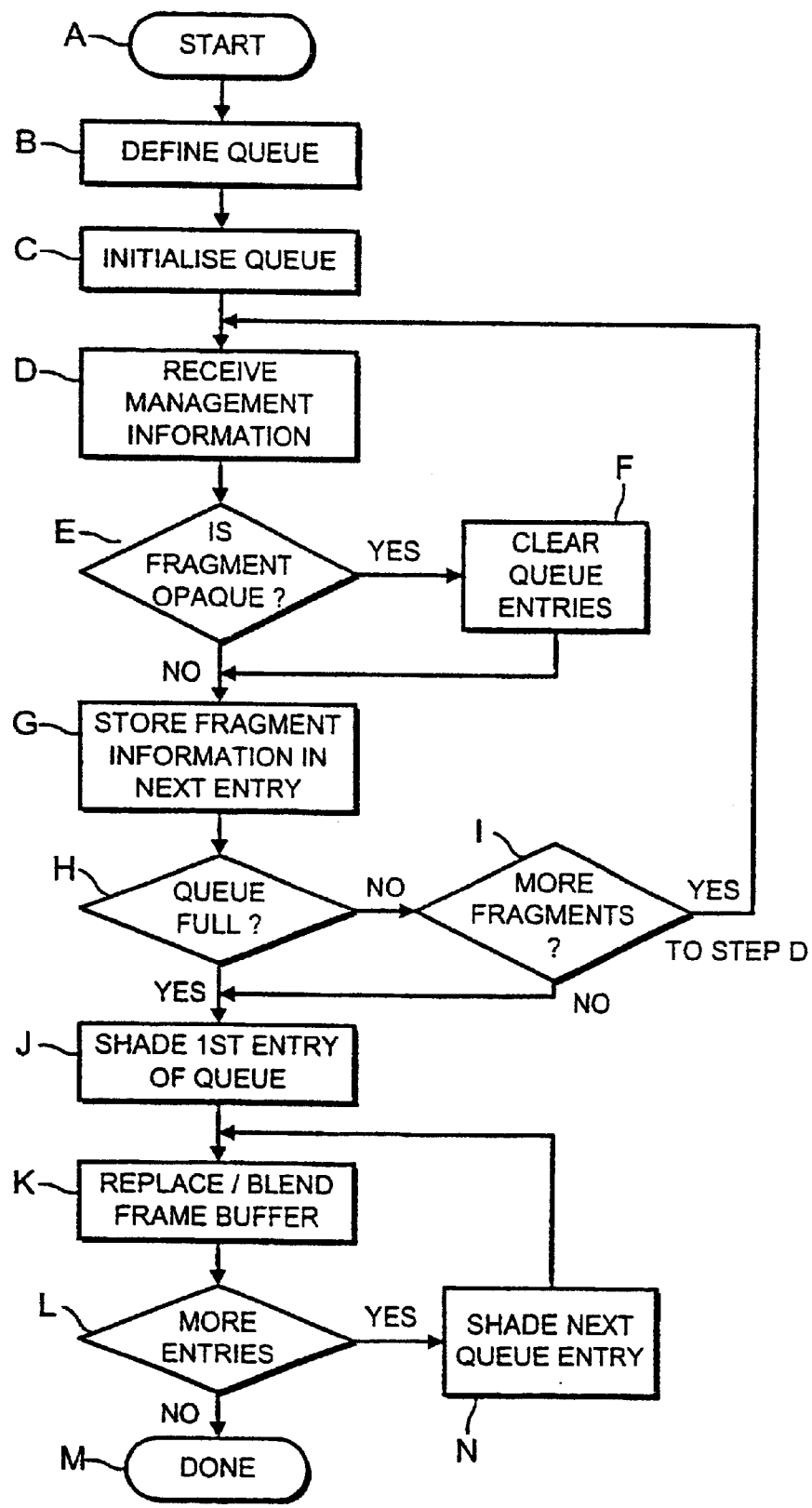
FIGS. 8 and 9 provide respective flow charts showing steps in methods according to aspects of the present invention.

FIG. 8 shows a flow chart of a method embodying the present invention. The process starts at step A and at step B a queue 19a, 19b, 19c (FIG. 10) is defined for each pixel. Each queue has a plurality of locations as illustrated in FIG. 10. The number of locations is arbitrary and in the example shown equals eight. However, any number of locations can be used. The queue is preferably stored in the memory unit 152 of the processor 15, but could be provided by a dedicated FIFO buffer or other suitable device. The queue is initialised by clearing all the locations of the queue.

Processing takes place on a pixel-by-pixel basis, with multiple pixels being processed in parallel. For each pixel, fragment information is received (step D). The fragment information includes data regarding the colour, texture and blending characteristics of the corresponding primitive of the pixel concerned. This first example assumes that no visual depth information is supplied, for example because the application software defining the geometry outputs primitive data in the correct order for display.

The blending characteristics of the fragment are tested (step E) to determine whether the fragment is opaque or blended. If the fragment is opaque then all the locations in the queue are cleared (step F). For both opaque and blended fragments, the fragment information is stored in the next available queue location (step G). These steps have the effect that if the fragment is opaque then the fragment information is stored in the first queue location, and if the fragment is blended then the information will be stored at the next available queue location.

The queue is analysed (step H) and if it is not full and there are more fragments to be processed (step I) then the process returns to step D for the receipt of further fragment information.

However, if the queue is full or if there are no further primitives to be processed, the fragment information stored at the first queue location is shaded (step J). The shading process determines the colour (pixel data) for the pixel caused by the fragment concerned. The pixel data is then supplied to the frame buffer of the display device to replace, or be blended with, the existing frame buffer data. The blending characteristics of the fragment determine whether the frame buffer is simply overwritten or blended with the new data. If no further queue locations have fragment information stored therein, then the process is complete (step M).

If further locations in the queue contain fragment information, then the fragment information of the next queue location is shaded (step N), and then blended (step K) with the frame buffer. This process continues until there are no further unprocessed queue locations.

In this way, shading and blending of fragment information can be deferred so that the large texture look-ups and other calculations which are required for shading and blending do not impact on the processing speed of the rasterisation process. In addition, the shading and blending is deferred until a large number of the processor units 15 are able to take part in the shading operation. This is particularly important in a single instruction multiple data (SIMD) processor architecture in which all processors process the same instruction at the same time.

Another advantage of this method is that when the queues are not filled during rasterisation, the number of shade steps is minimized. Even where a queue is filled, the number of shade steps will probably be less than the number of rasterisation steps.

Figure 9:
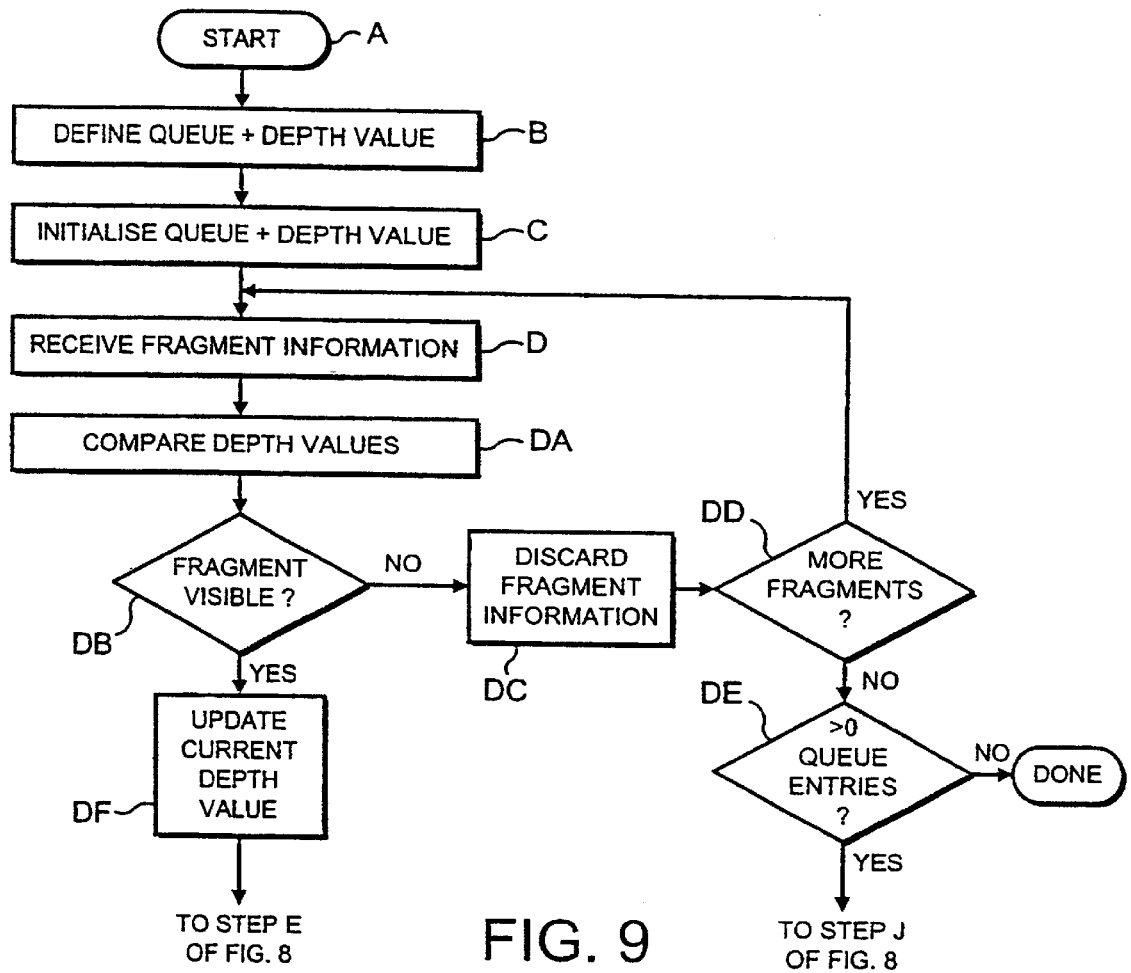
Figure 10:
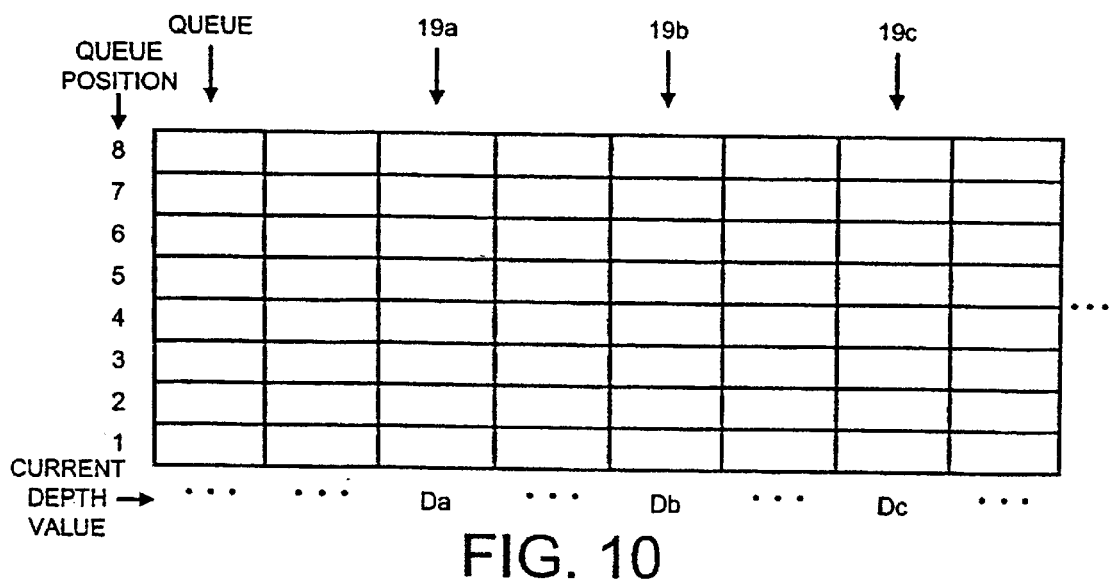
FIG. 10 illustrates the provision of a queue for each pixel.

An alternative method embodying the invention is illustrated in FIG. 9. If the host application does not supply the primitive information in the correct order, then the graphics system must perform some further processing so that the primitives are correctly displayed. One particular way of achieving this is for the host to supply visual depth information with the primitive information. The received fragment information then includes fragment visual depth information.

As before a queue is defined for each pixel (step B). In addition, a current depth value is assigned for the pixel. The queue and current depth value are initialised (step C), to zero. The fragment information is received (step D), and the fragment visual depth compared with the current visual depth (step DA). The depth test results are used to determine the visibility of the fragment (visibility test, step DB). If the fragment is not visible, then the fragment information is discarded. If there are more fragments to be processed then the process returns to step D to receive further fragment information. If there are no further fragments (step DE), and no fragment information stored in the queue (step DF) the process is complete (step DG). If fragment information is stored in the a queue, the processing proceeds to step J (FIG. 8).

If the primitive is visible, then the current depth value is updated to the newly received fragment depth value, and the fragment information is processed from step E of FIG. 8, as described above.

Figure 3:
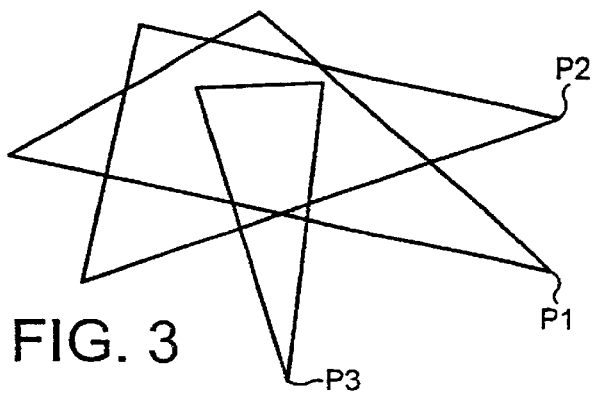
Figure 4:
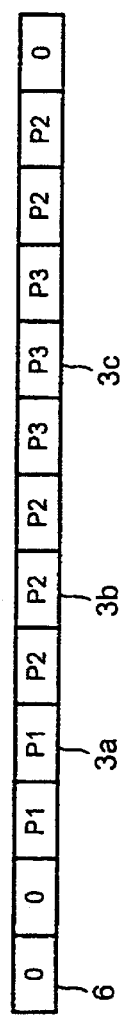
FIGS. 4 and 5 illustrate calculated frame buffers for non-blended and blended graphics primitives respectively.
Figure 5:
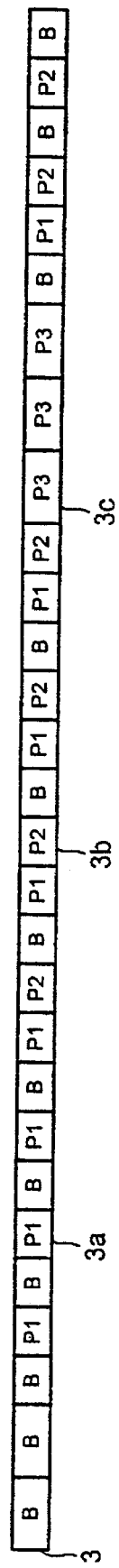

Referring now to FIGS. 2 and 3, and to FIGS. 10 to 13, the method of FIG. 9 will be illustrated by way of an example. In FIGS. 2 and 3, three primitive P1, P2 and P3 are shown. Each primitive has a respective visual depth value P1d, P2d and P3d. For the purposes of this example, primitive P1 is assumed to be blended, primitive P2 is opaque and P3 is blended. The primitives are assumed to arrive from the host in the order P1, P2, P3.

Figure 11:
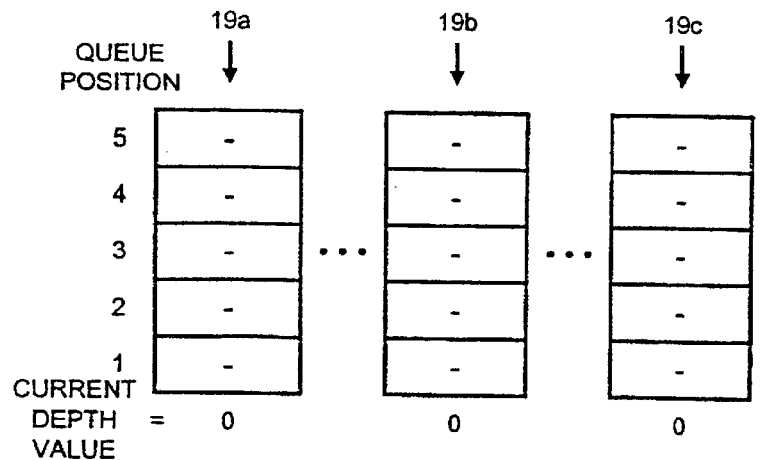
FIGS. 11 to 15 illustrate the queue contents for example pixels during processing in accordance with the method of FIG. 9.

FIG. 11 shows the state of the queues for each pixel after initialisation, all of the queue locations are empty and the depth current value is set to zero.

Figure 12:
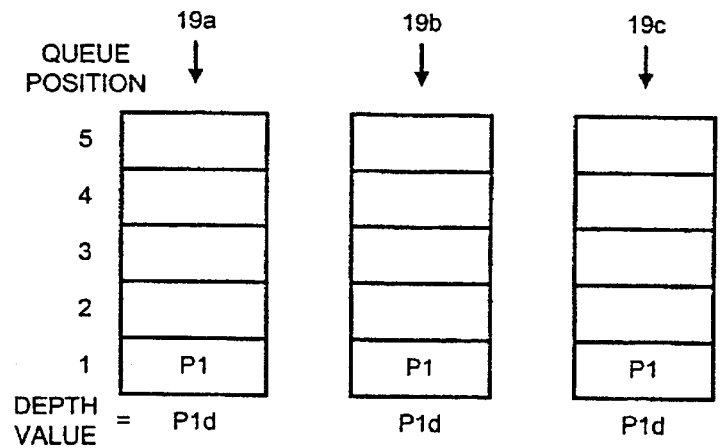

Fragment information relating to primitive P1 is received for pixels 3a, 3b and 3c and since the fragment depth value (P1d) is greater than the current depth value (0), the fragment blending characteristic is checked. Since primitive P1 is a blended primitive, the P1 fragment information is stored in the next available location in each queue, as shown in FIG. 12. The current depth value is updated to become P1d.

Figure 13:
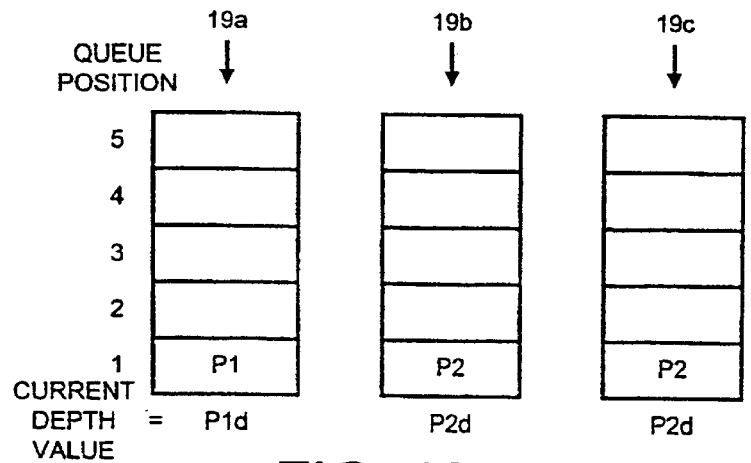

Fragment information relating to primitive P2 is received for pixels 3b and 3c and, since the primitive depth is greater than the current depth value (ie. P2d>P1d), the blending characteristics of P2 are tested. Since P2 is opaque, the queues for pixels 3b and 3c are cleared, and the P2 fragment information stored at the first queue location for queues 19b and 19c. The current depth value is updated for those two pixels. The result of this step is shown in FIG. 13.

Figure 14:
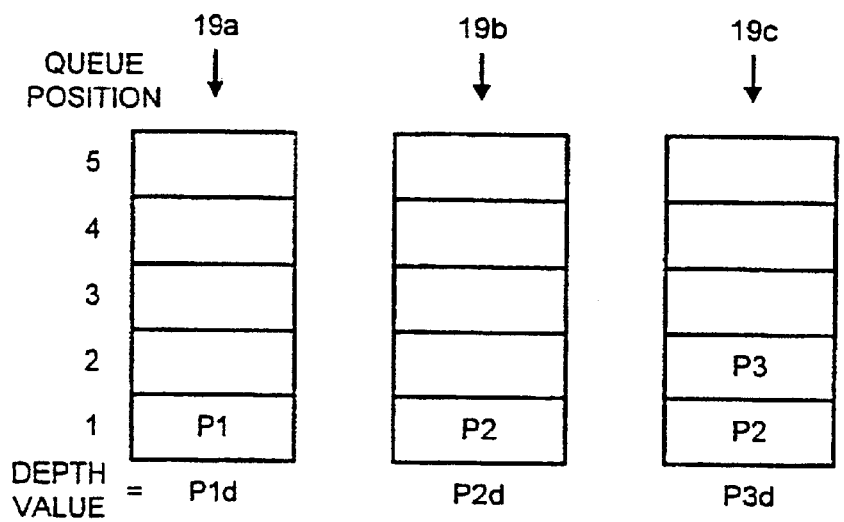

Finally in this example, fragment information relating to primitive P3 is received for pixel 3c and since P3d>P2d, the blending characteristics are tested. P3 is a blended primitive, and so the P3 information is added to the queue for pixel 3c, and the depth value for that pixel updated to become P3d. This is illustrated in FIG. 14.

Figure 15:
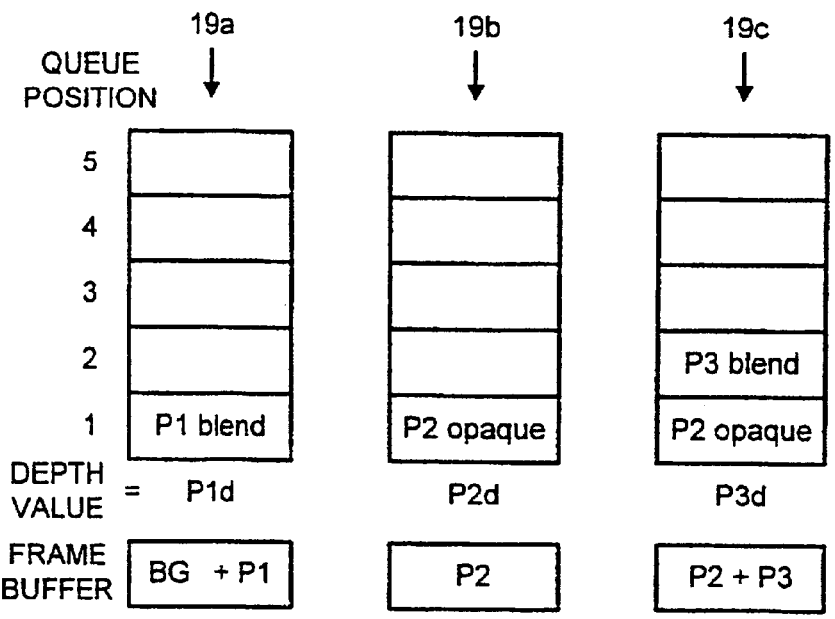

Since P3 is the last primitive to be processed, the shading and blending processes can now take place. The results of theses steps are shown in FIG. 15.

For pixel 3a, primitive P1 is blended and so the pixel data derived from shading according to the P1 fragment information is blended with the current background information (BG) to produce the new frame buffer contents (BG and P1).

For pixel 3b, primitive P2 is opaque, and so the frame buffer is simply overwritten with the pixel data derived from shading according to the P2 fragment information.

For pixel 3c, the first queue location relates to the opaque primitive P2 so the frame buffer is overwritten with the P2 fragment data. However, a second queue location exists for pixel 3c, and so that location is shaded and blended with the frame buffer to produce the final frame buffer contents (P2 and P3).

The above described method is appropriate to simple depth testing to determine visibility of the primitive. However, "α-testing" of primitives can cause additional complications. α-testing operates on the α-value used for blending and is used for primitives having a texture which includes holes. For example, a mesh or net-like texture defines a series of holes bound by material. The α-value would then vary from 1.0 for the net material to 0.0 for the holes. It is of course possible simply to shade and blend each pixel using the α-value. However, this is wasteful of resources since those pixels having α=0.0 result in no change to the frame buffer, and so processing effort is effectively wasted. Subjecting the α-value to a threshold test (the "α-test") enables unnecessary processing to be avoided. All pixels having an α-value less than the threshold are not processed.

If an α-tested fragment is defined at a pixel, there is then uncertainty concerning the actual colour to be displayed, unless the α-test is performed. However, α-testing must be performed as part of the shading process because the actual α-value is determined by the part of the texture to be shown at the pixel and so, in the FIG. 9 method, potentially important fragments may be discarded because they fail the simple depth test. Thus, the decision concerning the queue contents is effectively determined by the result of processing the data held in the queue. The goal of the method described above is to defer such calculations so that the rasterisation process can be carried out efficiently. Performing shading to determine the result of the α-test would therefore defeat this goal.

However, a development of the above described method embodying the present invention enables α-testing to be supported. The fragment information received by the system includes a flag which indicates simply if the fragment uses an α-tested texture. The flag does not itself give the result of the α-test.

In order to prevent potentially important fragments failing the simple depth test, a second current depth value is used for each pixel. The first current depth is the non-α-tested depth, and the second is the α-tested depth. Initially, both current depths are set to the background depth (typically zero).

Two depth values are required because the presence of an α-tested fragment leads to uncertainty in the actual visible depth at a pixel. A pixel may show a colour of the α-tested-texture, or may occur at a hole in the texture. This does not become apparent until the α-test is performed as part of the shading process. The first depth value can therefore be seen to represent the certain visible depth, behind which fragments do not contribute. The second depth value represents the uncertain visible depth, behind which fragments may or may not contribute.

The method described above is then modified to handle the following fragment types:

Any fragment behind the non-α-tested (first) depth is discarded.

An opaque fragment (not blended nor α-tested) in front of the α-tested (second) current depth clears the queue, replaces the first queue location, and sets both depth values to the new depth value.

A blended, non-α-tested fragment in front of the α-tested depth, is stored in the next available position in the queue and both current depth values are updated to the new value.

An α-tested fragment which occurs in front of the α-tested depth value is stored in the next available queue location, and the α-tested (second) depth value is updated.

A non-α-tested fragment which occurs between the two current depth values is stored at the next available position in the queue and the current non-α-tested depth value is updated.

An α-tested fragment which occurs between the two current depths is stored at the next available queue position, but does not update either of the current depth values.

The order in which items are placed in the queue is the order that they are shaded and blended. As the fragment information is not strictly depth-tested before being placed on the stack, the depth test must be performed for the true (certain) current depth after each α-test (after each shade and blend step). Therefore, the α-test may determine that a later primitive does not, in fact, have an effect on the pixel concerned and that the data can be discarded.

Figure 16:
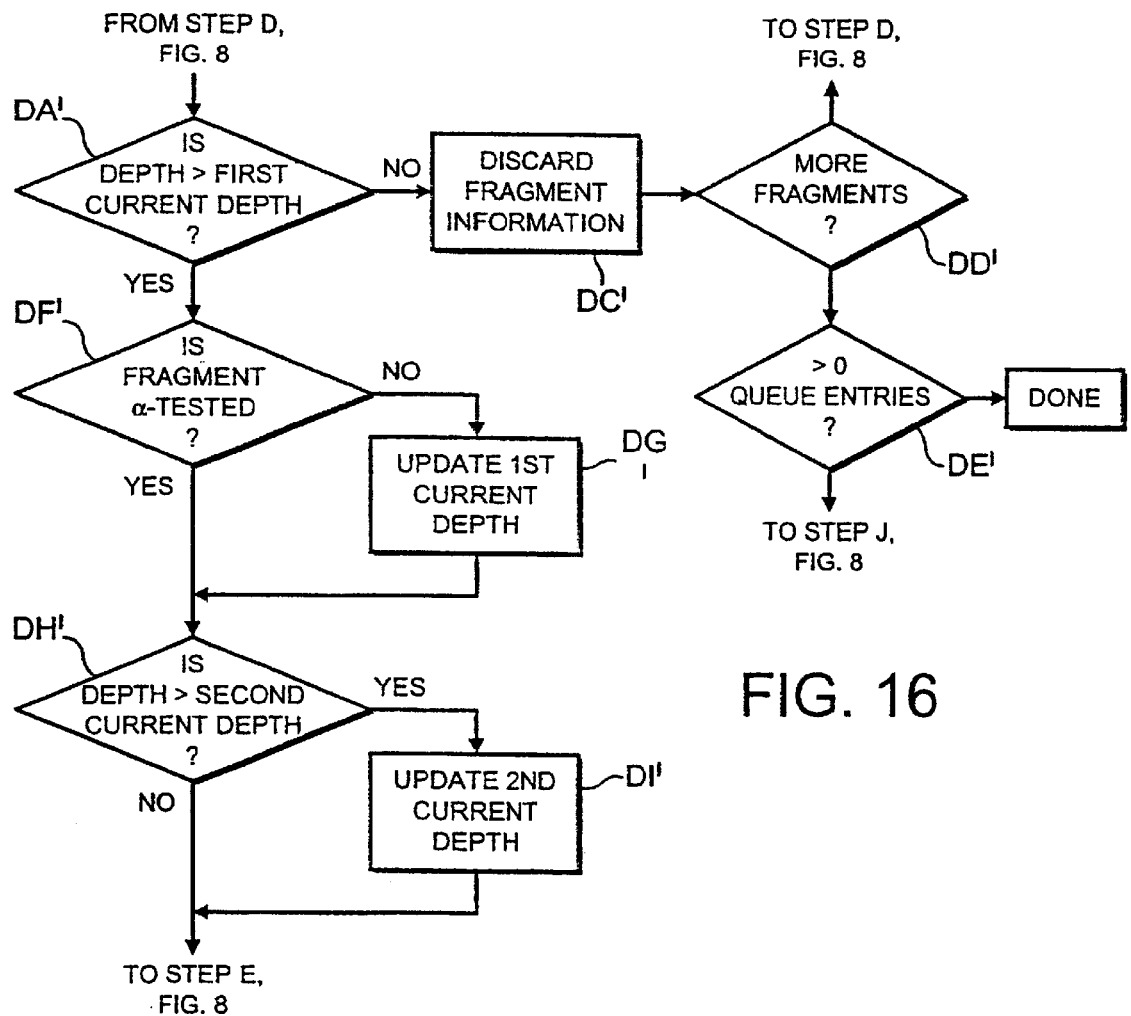
FIG. 16 illustrates an alternative method of embodying an alternative aspect of the present invention.

FIG. 16 shows a flow chart of a method embodying the present invention for use with α-tested primitives. The initial stages of the process are as shown in FIG. 9, with the exception that two depth values are defined for each queue.

The visibility, or depth, test, now includes three tests. Firstly, the fragment depth value is compared (step DA') with the first depth value, i.e. against the current certain depth value. If the fragment is not visible with regard to the first depth value, then the fragment information is discarded (step DC'), and the usual test (steps DD', DE') made regarding further fragments being available. If the fragment is visible with regard to the first depth value, the α-test flag is examined (step DF'). If the α-test flag indicates that the primitive is not α-tested, then the first depth value is updated (step DG') to be equal to the fragment depth value, ie. the certain, non-α-tested depth is updated.

If the primitive is α-tested, then the first depth value remains unchanged and the fragment depth value is tested (step DH') against the second (α-tested) depth value.

If the fragment depth value indicates that the fragment is visible with respect to the second depth value, then the second depth value is updated (step DI') with the fragment-depth value and processing proceeds as before (ie. to step E of FIG. 8).

Figure 17:
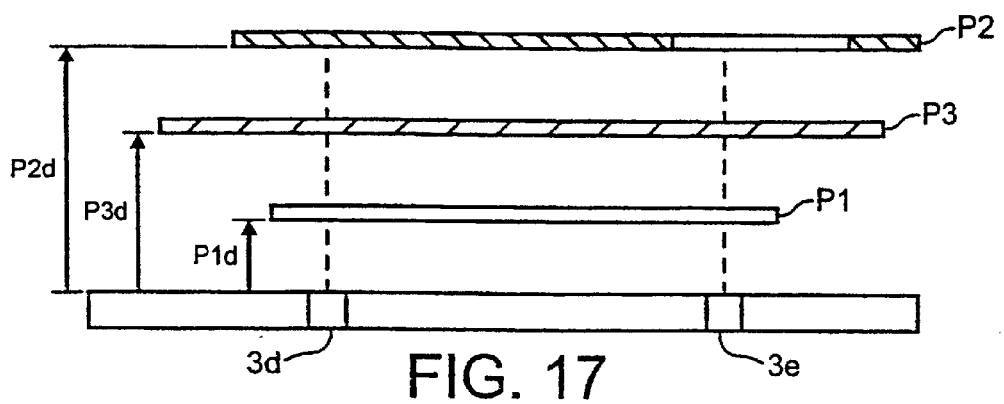
FIG. 17 illustrates primitives including an alpha tested primitive.

Referring now to the example primitives shown in FIG. 17, the α-tested method will now be illustrated. In FIG. 17, the primitives are produced by the host application in the order P1, P2, P3, and all primitives are blended. Primitive P2 is an α-tested primitive, as illustrated by the partial cross hatching in the Figure. The processing of pixel data for two pixels 3*d* and 3*e* will be explained with reference to FIGS. 18 to 22.

Figure 18:
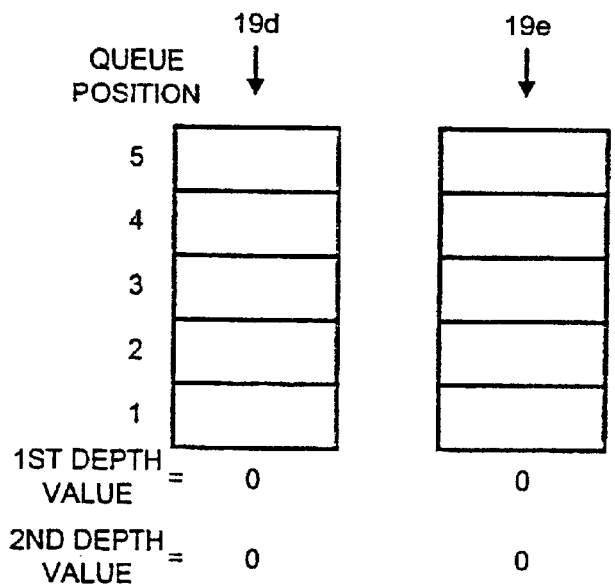
FIGS. 18, 19, 20 and 21 illustrate queue contents during processing of the primitives of FIG. 17 in accordance with the process of FIG. 16.
Figure 19:
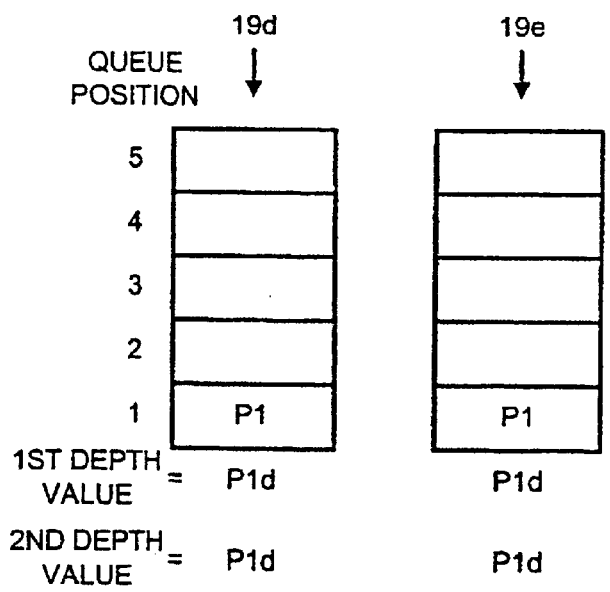

After initialisation, the queue for each pixel is cleared and both depth values are set to zero (FIG. 18). The fragment information relating to primitive P1 is received and since the P1 fragment depth value is greater than both the first and second current depth values, fragment information is stored in the first queue location and both depth values set to P1d for both pixels (FIG. 19).

Figure 20:
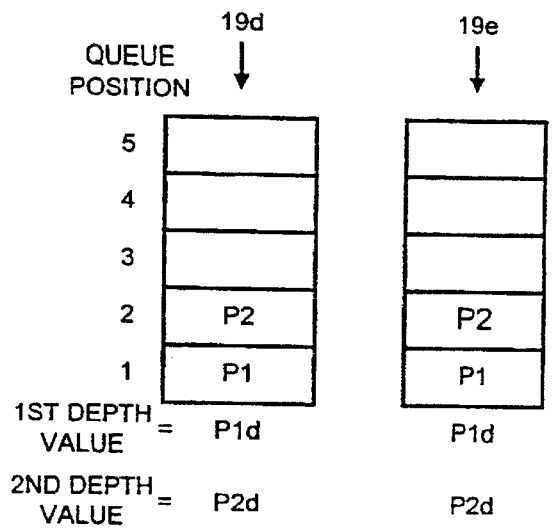
Figure 21:
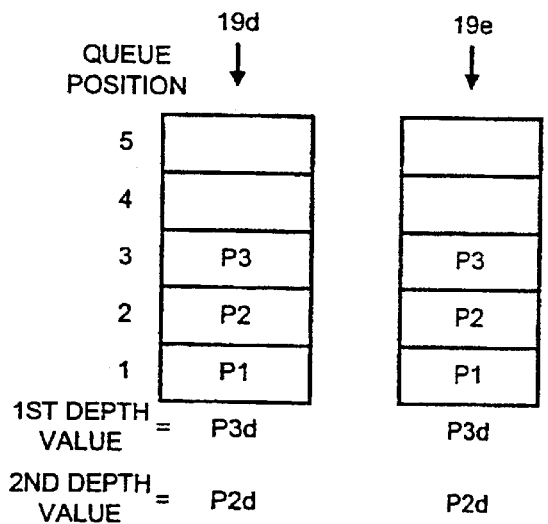

The second primitive P2 is blended and has a larger depth value than the P1 fragment and so the fragment information is stored in the second queue location for each pixel. However, since P2 is also α-tested, the actual visible depth produced by P2 is uncertain. Therefore, only the second depth value is updated to P2d (FIG. 20).

Fragment information relating to the third primitive. P3 is received. The depth value for P3 therefore is larger than the P1 depth value, and smaller than the P2 depth value. Since the P1 depth value is the certain (non-α-tested) depth value, then the P3 fragment information is stored in the next available queue location, and the value is set to P3d. The second depth value is not updated because P3 is not visible with regard to the P2 depth value. However, the actual visibility of P3 will be calculated during the shading process in which the actual pixel values contributed by P2 will be determined.

When the queue locations are processed, the fragment information relating to primitive P3 will be discarded for pixel 3*d*, because P2 contributes to pixel 3*d* (ie. α>threshold), and so P3 will fail the depth test for pixel 3*d*. The result for pixel 3*d* will be a blend of the background, P1 and P2.

Figure 22:
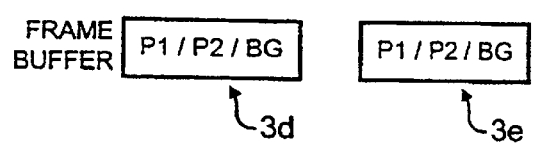
FIG. 22 illustrates final frame buffer contents.

Since P2 does not contribute to pixel 3*d* (i.e. α<threshold) then pixel 3*e* results in being a blend of background, P1 and P3, as illustrated in FIG. 22.

It will therefore be appreciated that methods of processing graphical data embodying the present invention can provide increased flexibility and performance over the prior considered methods, in particular when handling blended and α-tested graphical primitives.

The above described method is appropriate when all fragments use the same rule to determine visibility with regard to depth. This may be either that a fragment with a larger depth value than the current depth is visible, or alternatively that a fragment with a smaller depth value than the current value is visible. The method can be further extended to allow a mixture of fragments in which the depth test varies. Each time a fragment is presented which has a different test to the proceeding fragment, the alpha-tested and non-alpha-tested depth values are swapped before the fragments depth is tested. This is the only modification required.

A method of processing graphical data embodying one aspect of the present invention will now be described with reference to FIGS. 6, 7 and 23 to 27. As illustrated in FIG. 24 a respective data queue 19*a*, 19*b*, 19*c* is defined for each pixel 3*a*, 3*b*, 3*c* (FIG. 2). Each queue has a plurality of locations and acts as a first-in-first-out queue. Each queue is preferably defined within the processor memory unit 152, although could be implemented as a dedicated FIFO buffer or other appropriate device.

Graphical primitive information is received from the host system 11 a single primitive at a time. A rasterisation and sorting process identifies the pixels that are included in the primitive and divides the primitive into fragments, one fragment per pixel. When all of the primitives have been rasterised and sorted, the pixel attribute calculation can begin. Such rasterisation and sorting processes are well known in the art.

Figure 23:
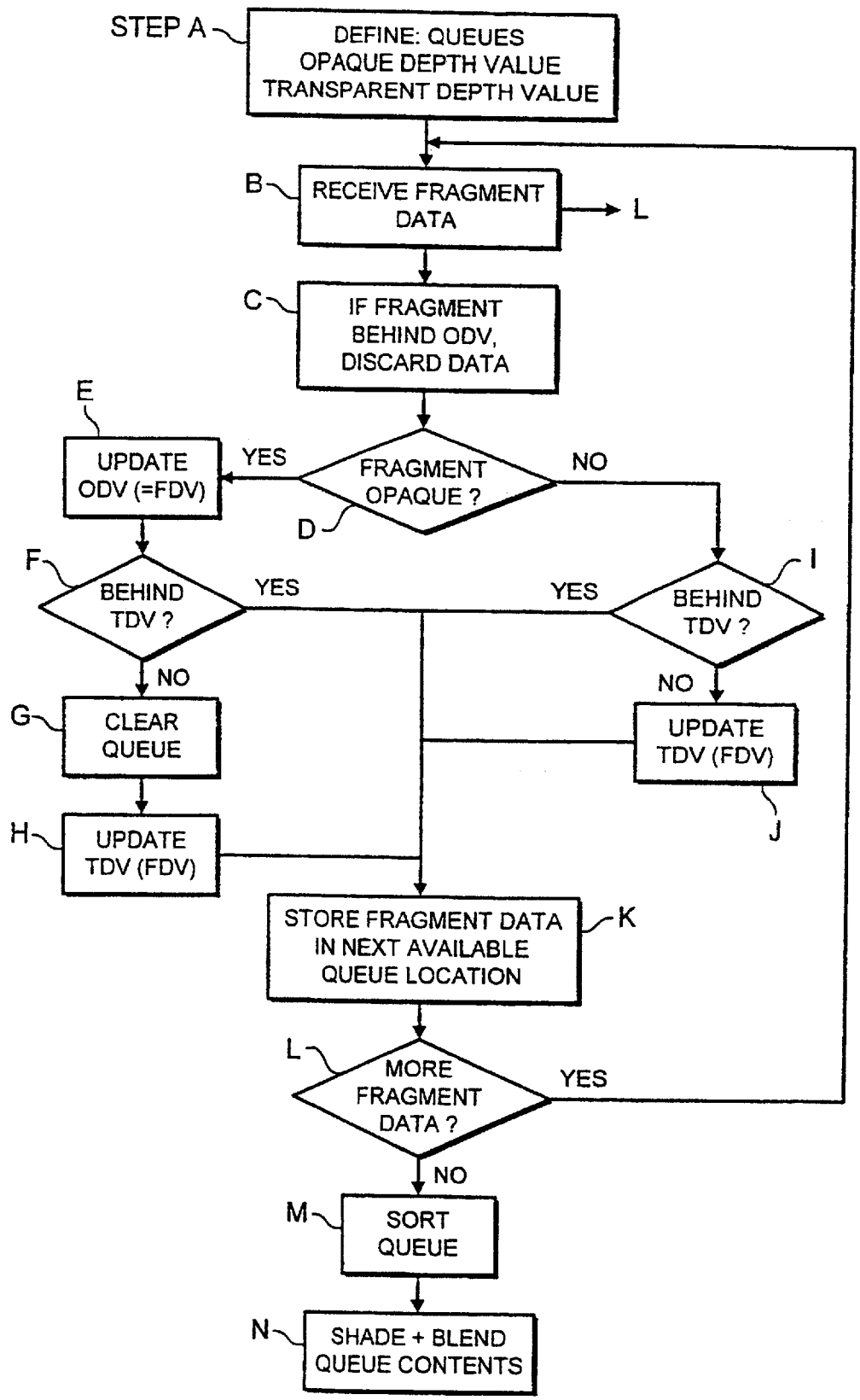
FIG. 23 illustrates a method embodying the present invention.
Figure 24:
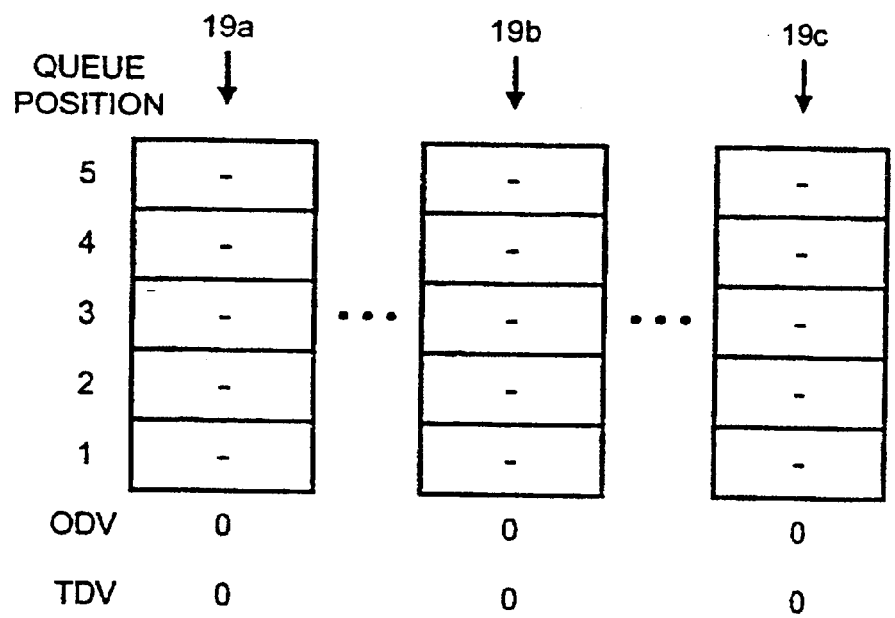
FIGS. 24, 25, 26 and 27 illustrate one example processing using the method of FIG. 23.

FIG. 23 shows a flow chart of a first method embodying the present invention. At step A the queue for each pixel is defined, and two depth values are defined. A first depth value, the "opaque depth value (ODV)", indicates the current depth of the most visible opaque fragment at the pixel, and a second value, the "transparent depth value (TDV)" relates to the most visible transparent fragment at a pixel.

Fragment data is received step B, and its depth value is compared with the current ODV. If the fragment is found not to be visible (i.e. it is behind the current opaque depth value, then the data is discarded. If the fragment is visible (i.e. not behind the opaque depth value) then the fragment is tested to see whether it is opaque (step D). If the fragment is opaque, then the opaque depth value (ODV) is updated to equal the fragment depth value. The fragment is then tested to determine whether the fragment is behind the current transparent depth value (step F). If the fragment is not (i.e. it is in front of the TDV) then the queue for that pixel is cleared (step G) and the TDV updated to equal the fragment depth value (step H). Processing then moves to step K in which the fragment data is stored in the next available queue location for the pixel. If the opaque fragment is determined to be behind the transparent depth value, then the queue is not cleared, but the fragment data is stored in the next available queue location.

For non opaque (transparent) fragments determined at step D, the fragment depth value is again tested to determine whether the new fragment is behind the current transparent depth value (step I). If the new depth value is behind the current transparent depth value, then the fragment data is stored in the next available queue location. However, if the new depth value is in front of the transparent depth value, the transparent depth value is updated (step J) before the fragment data is stored in the next available queue location (step K).

The process continues whilst there is more fragment data available (step L). When no further fragment data is available, then the queue contents are sorted into depth order (step M) with any fragment data behind the frontmost opaque value being discarded. When the queue has been sorted into depth order, then the shading an blending of the queue contents (step N) can be undertaken in order of queue location. The first location contents are shaded and blended with the frame buffer contents to produce updated frame buffer contents. The second queue location can then be shaded and blended itself. This shading and blending continues until the queue contents are all shaded.

The method of FIG. 23 will now be illustrated using the primitives shown in FIG. 2. In FIG. 2, the first primitive P1 is a transparent primitive, the second primitive P2 is an opaque primitive, and the third primitive P3 is a transparent primitive. It is assumed in this first example that the primitive data arrives in the order P1, P2 and P3.

Figure 25:
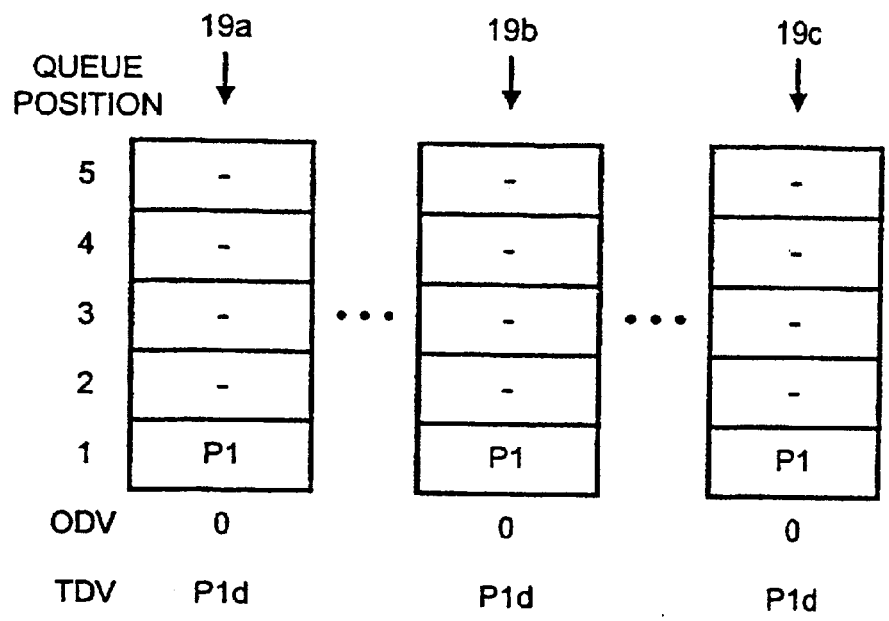

The queues and depth values are initialised as shown in FIG. 24, and the data relating to P1 is received. Since P1 is in front of the current depth value (0), is not opaque and is in front of the current transparent depth value, the P1 fragment data is entered in the first location of each queue and the transparent depth value for each pixel updated (FIG. 25).

Figure 26:
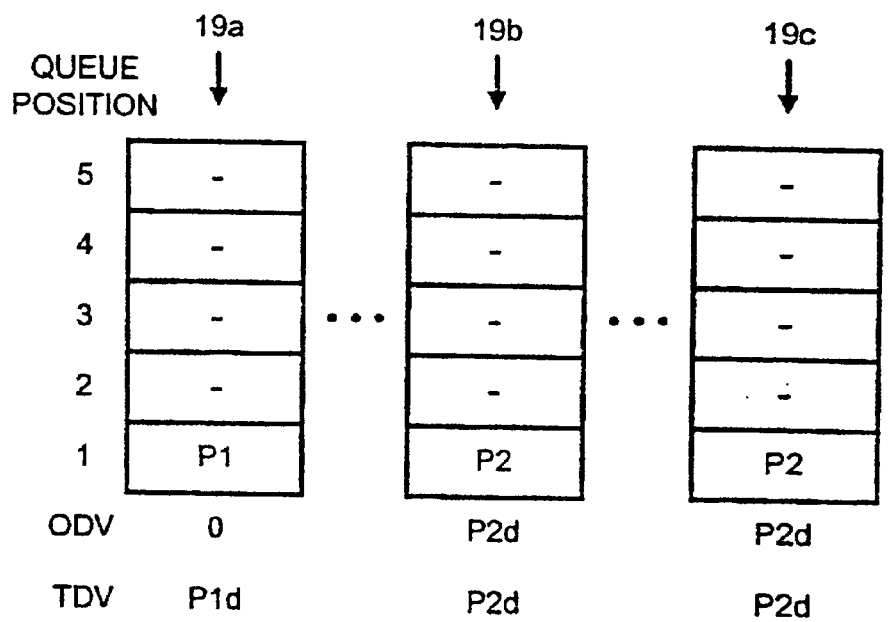

Date concerning primitive P2 is then received. Since P2 is opaque, is front of the current opaque depth, and is in front of the current transparent depth, queues 19B and 19C relating to pixels 3B and 3C are cleared and P2 fragment data entered in the first queue location. The opaque depth value and the transparent depth value for each queue is updated in line with P2. This result is shown in FIG. 26.

Figure 27:
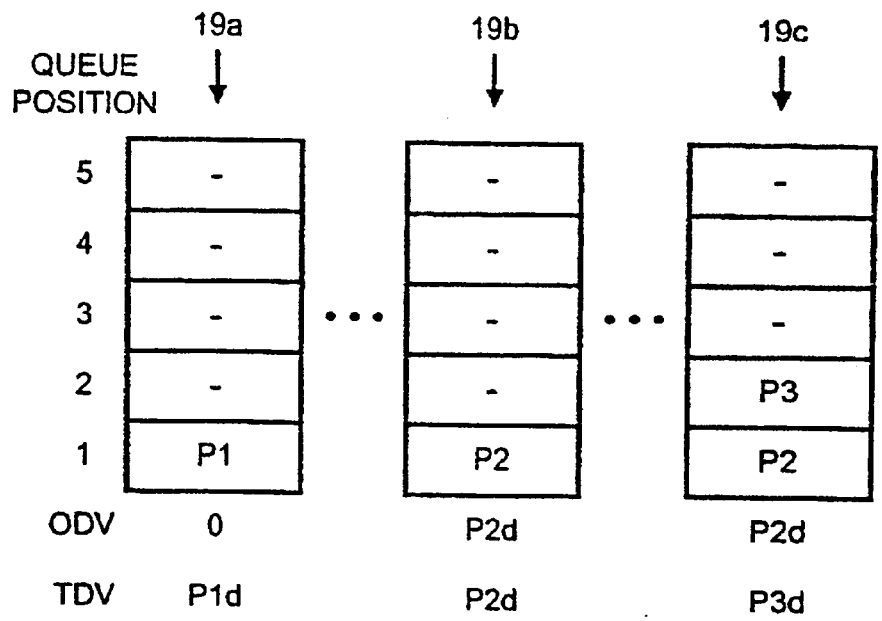
Figure 28:
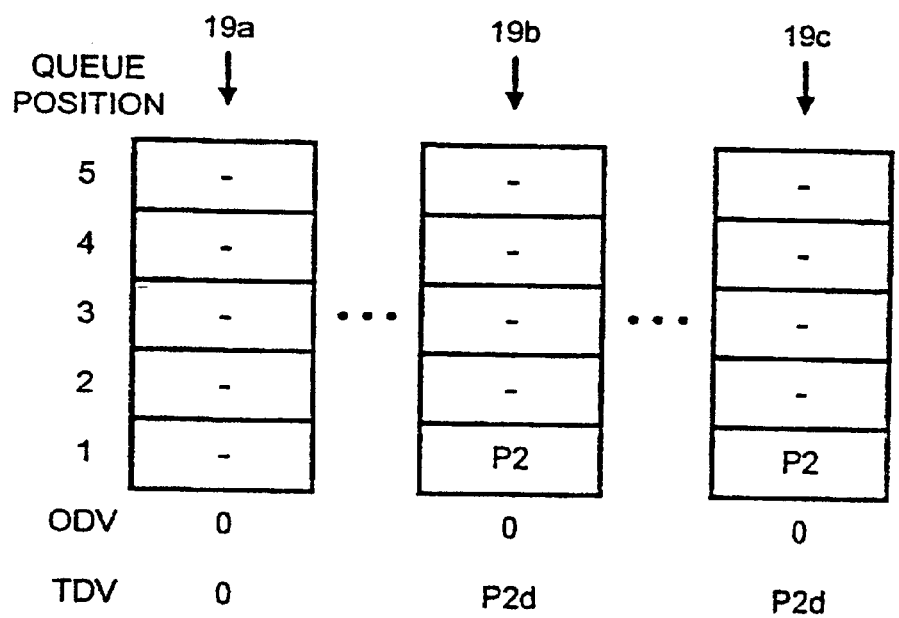
FIGS. 28, 29, 30 and 31 illustrate another example processing using the method of FIG. 23.
Figure 29:
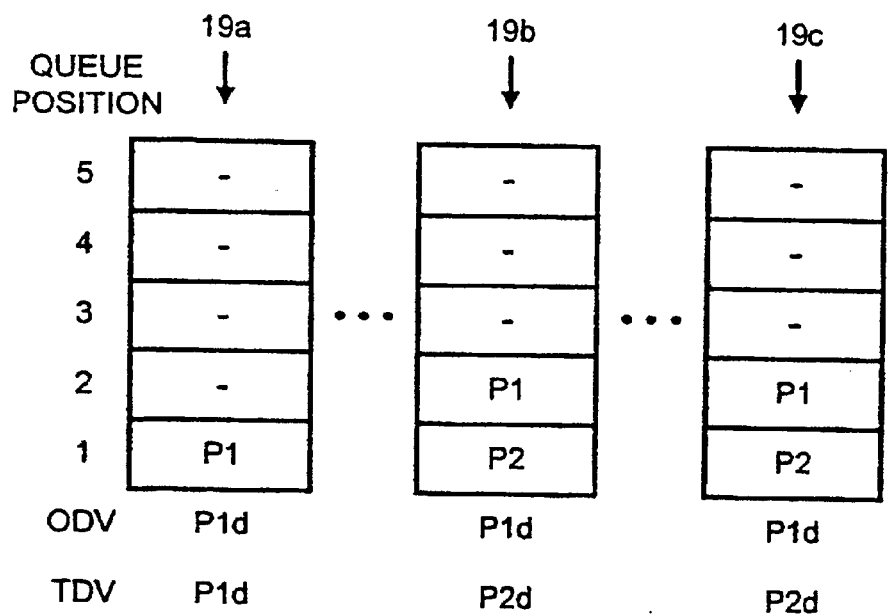
Figure 30:
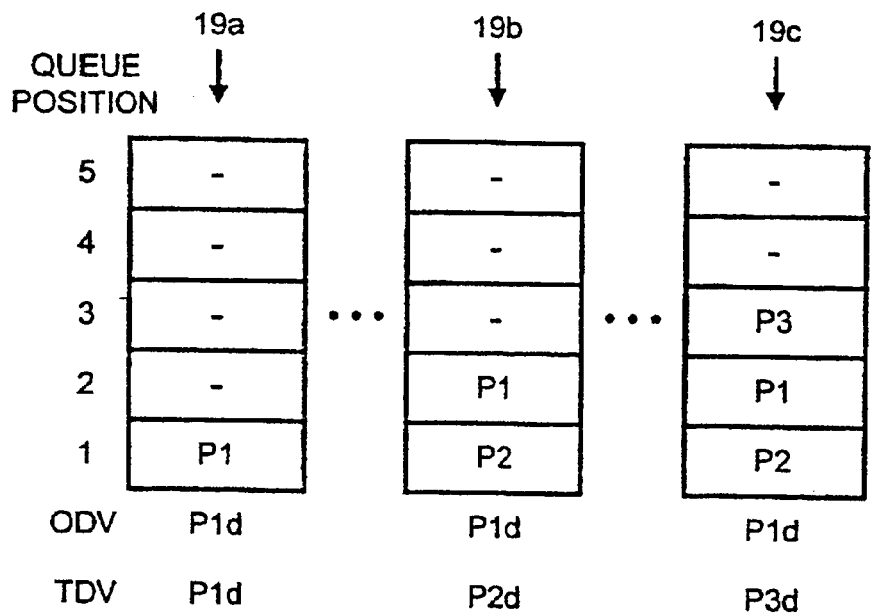

Data concerning primitive P3 is then received. Since P3 is a transparent primitive which is in front of the current opaque and transparent depth values, its data is entered into the next available location for queue 19C (the second location) and the transparent depth value for that queue is updated appropriately. No change is made to the opaque depth value, since the third primitive P3 is a transparent primitive. The final queue contents and depth values are shown in FIG. 27. It will be noted that in this first example, since the primitive information is supplied in the correct depth order, that no sorting of the queue is required.

A second example of the results of the method of FIG. 23 will now be explained using the primitives shown in FIG. 2. However, in this second example the primitives arrive in the order P2, P1, P3. In this example, P1 is an opaque primitive, and P2 and P3 are transparent primitives. The queues and depth values are once again initialised, and the primitive information relating to P2 is received. Since P2 is the first primitive to be received, its data is loaded into the first locations of queues 19B and 19C. The transparent depth values for both queues is updated to the second primitive value, but the opaque depth value is not since the primitive P2 is transparent.

Data relating to primitive P1 is then received and for the first queue (19A) is entered in the first location and the opaque and transparent depth values updated appropriately. For the remaining queues 19B and 19C, since P1 is an opaque primitive which has a depth value below the current transparent depth value for those pixels, data relating to P1 is loaded into the next available (second) location in each queue. Depth value for each queue is updated to be in line with the first primitive, but the transparent depth value remains as the P2 value, since P2 is in front of P1.

Figure 31:
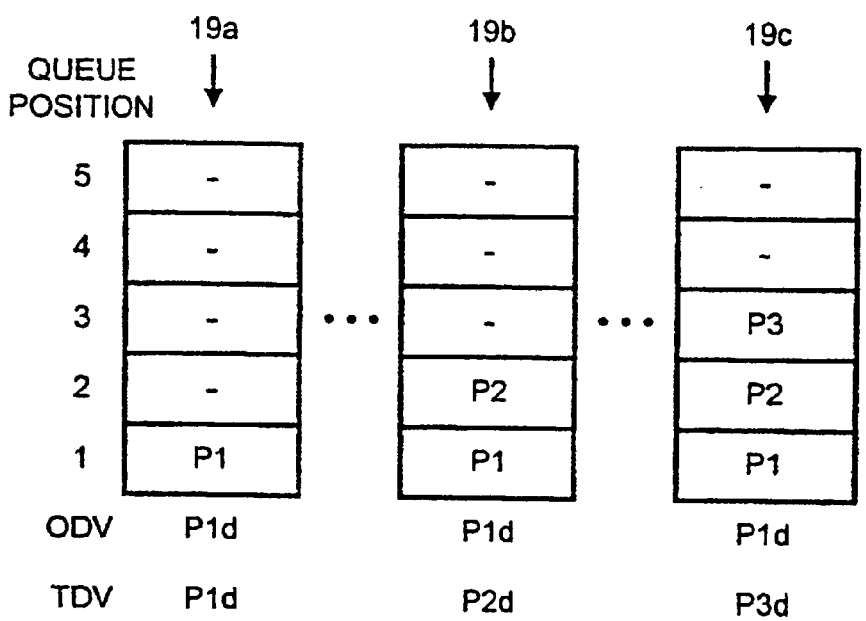

Data relating to primitive P3 is then received, and for queue 19C the primitive is visible (i.e. in front of the current opaque depth value) and so its data is loaded into the next available queue location (location 3) since it is a transparent primitive. The transparent depth value is updated to the P3 value, but the opaque depth value remains the P1 value. Since there are no further fragments available to be processed, the queues are sorted into depth order, with the lowest depth value primitive occupying the first location in the queue. The results of the sorting process can be seen in FIG. 31.

In this way, shading and blending of fragment information can be deferred so that the large texture look-ups and other calculations which are required for shading and blending do not impact on the processing speed of the rasterisation process. In addition, the shading and blending is deferred until a large number of the processor units 15 are able to take part in the shading operation. This is particularly important in a single instruction multiple data (SIMD) processor architecture in which all processors process the same instruction at the same time.

Another advantage of this method is that when the queues are not filled during rasterisation, the number of shade steps is minimized. Even where a queue is filled, the number of shade steps will probably be less than the number of rasterisation steps.

Figure 32:
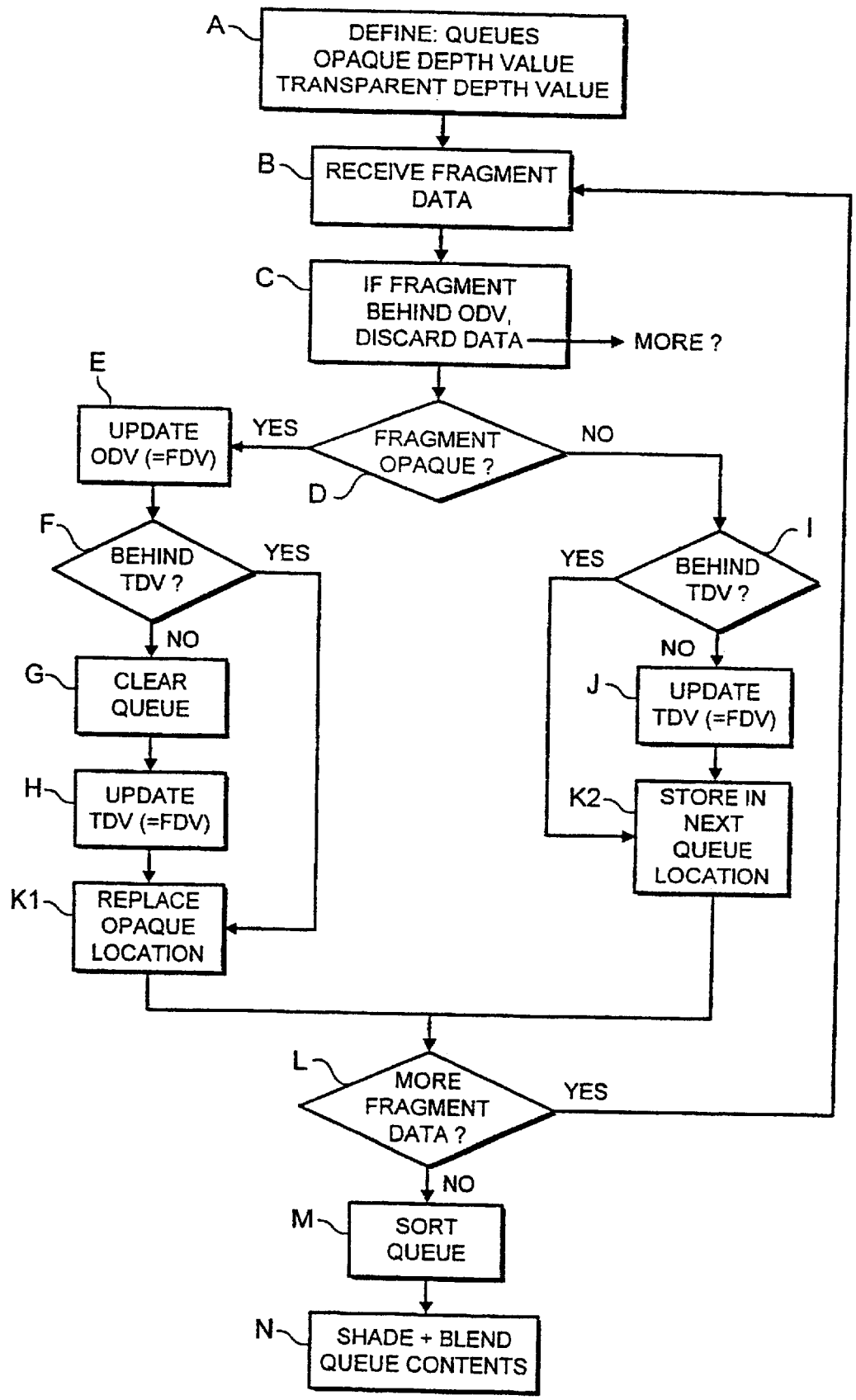
FIG. 32 illustrates another method embodying the present invention.

An alternative method embodying the invention is illustrated in FIG. 32. The method of FIG. 32 is identical to the method described with reference to FIG. 23, with the exception that in the method of FIG. 32 a specific location in each queue for each pixel is reserved for storing the most visible opaque primitive information. Thus, step K of FIG. 23 is replaced by two steps K1 and K2 in FIG. 32. For an opaque fragment the opaque location is replaced when that opaque fragment is visible, i.e. when it is in front of the current opaque depth value. If the new opaque fragment is in front of the current transparent depth value, then the queue is cleared, as before, and the transparent depth value updated.

Figure 33:
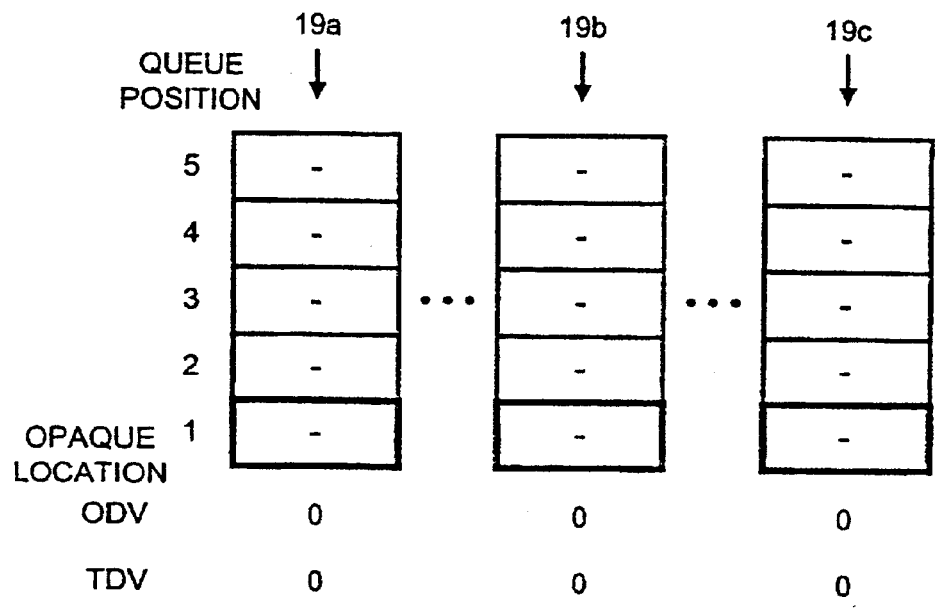
FIGS. 33, 34, 35 and 36 illustrate one example processing using the method of FIG. 32.
Figure 34:
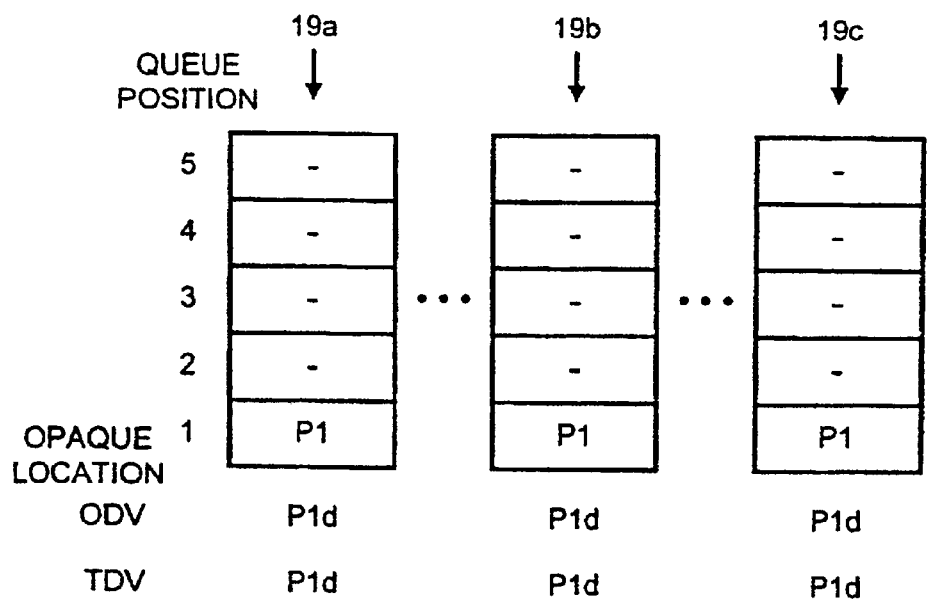
Figure 35:
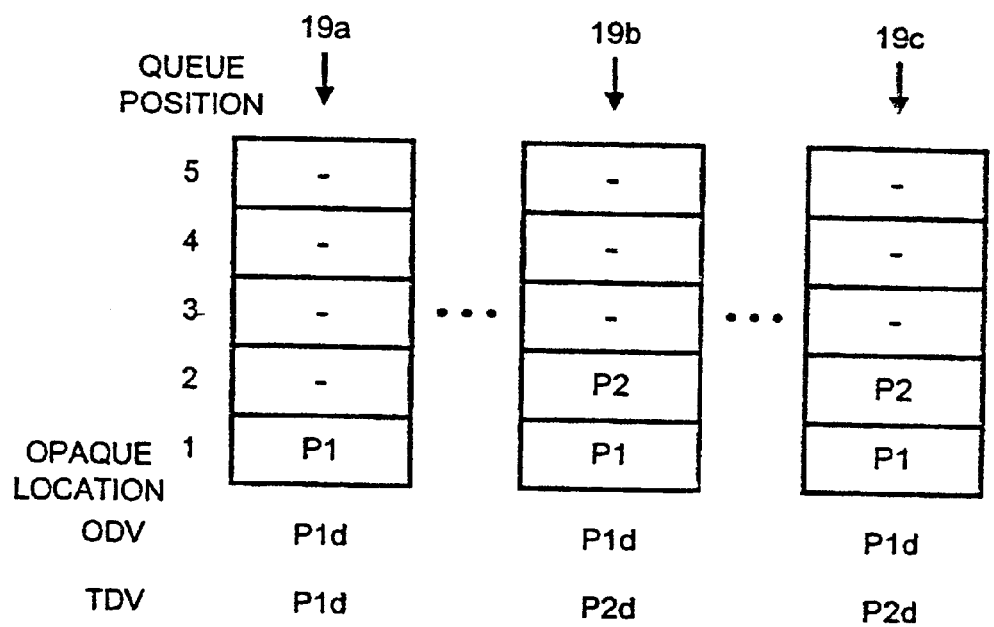

For transparent fragments, the fragment data is stored in the next available queue location, but not in the opaque location. The method of FIG. 32 will be illustrated with reference to the primitives of FIG. 2, assuming that the primitive P1 is opaque primitive P2 is transparent and primitive P3 is opaque. It will also be assumed that the primitive data is received by the system in the correct order, i.e. P1 followed by P2 followed by P3. FIG. 33 shows the initialised queues and depth values, with the first position in each queue reserved for the most visible opaque data. Data relating to primitive P1 is received and since the primitive is opaque, its date is loaded into the opaque location of each queue. The opaque depth value and transparent depth values are updated to relate to this first primitive (FIG. 34). Data relating to primitive P2 is received, and since this primitive is transparent the opaque location of each queue remains unchanged, and the P2 primitive data is loaded into the second location of queues 19B and 19C. The opaque depth values are unchanged, but the transparent depth values are updated to relate to the second primitive (FIG. 35).

Figure 36:
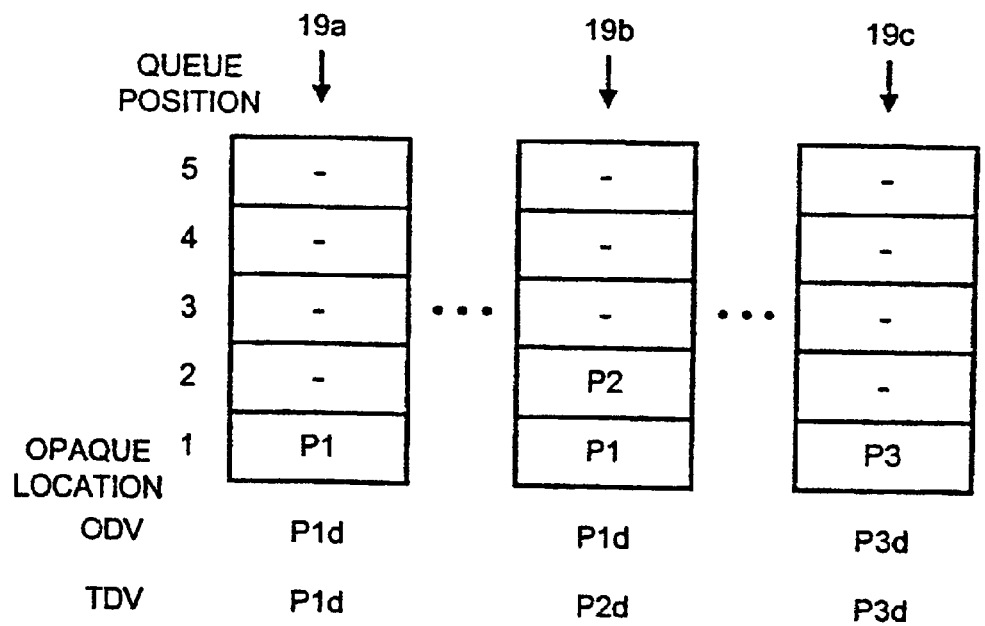

Data for primitive P3, which is an opaque primitive, causes the queue 19C to be cleared and the data for primitive P3 stored in the opaque location of that queue. The opaque depth value and transparent depth value are updated to relate to primitive P3, since primitive P3 is the most visible primitive (FIG. 36).

The methods described with reference to FIGS. 23 and 32 can also be used for alpha tested primitives, i.e. where the fragment depth value is uncertain, simply by treating all fragments (including opaque) as being transparent. The sort process can then be used to discard those fragments which are not visible.

Figure 37:
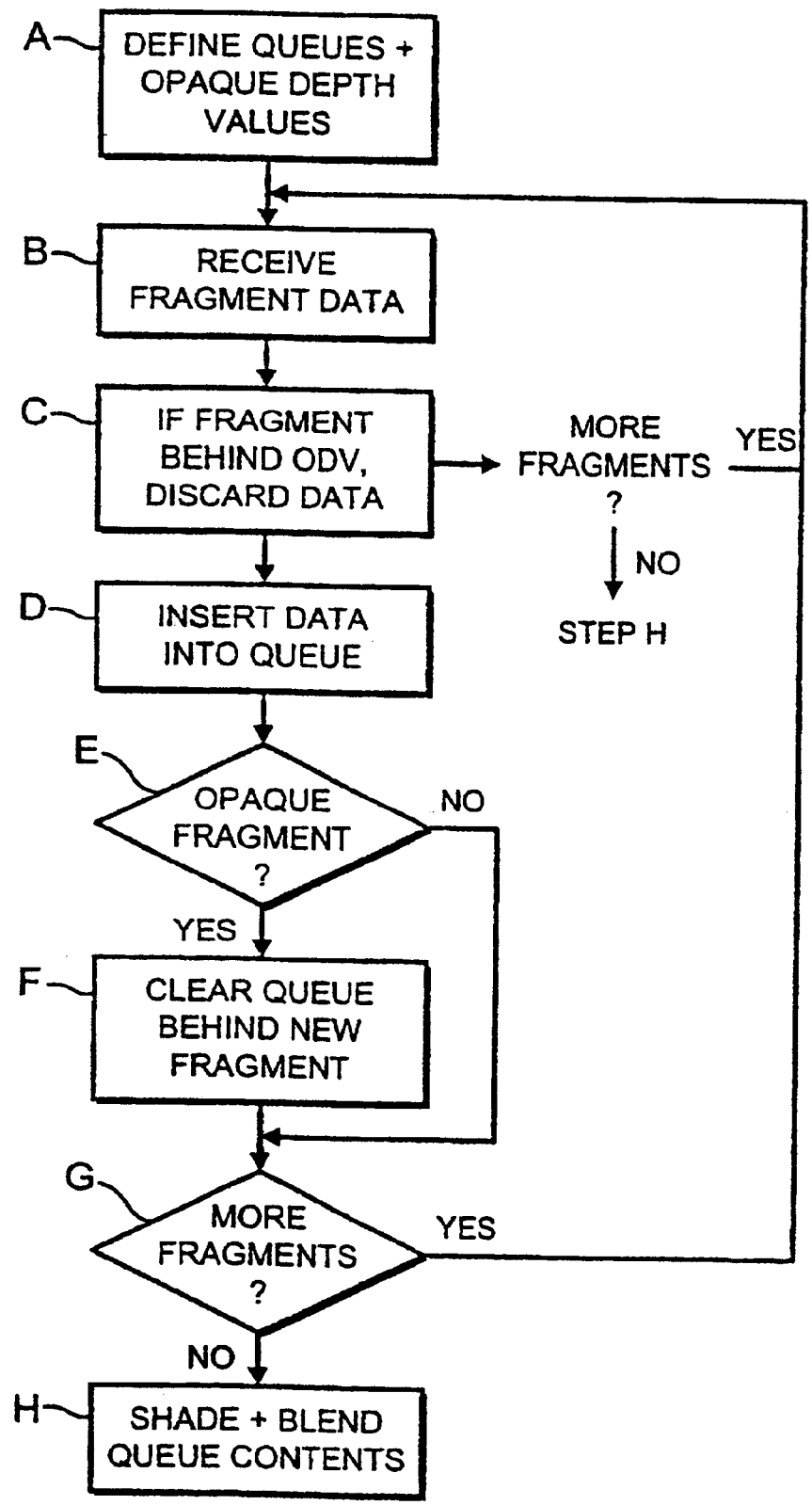
FIG. 37 illustrates another method embodying the present invention.
Figure 38:
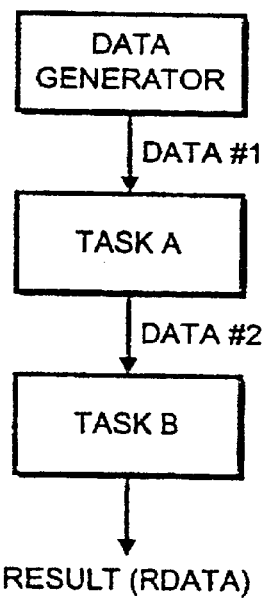
FIGS. 38 and 39 illustrate conventional data processing techniques.
Figure 39:
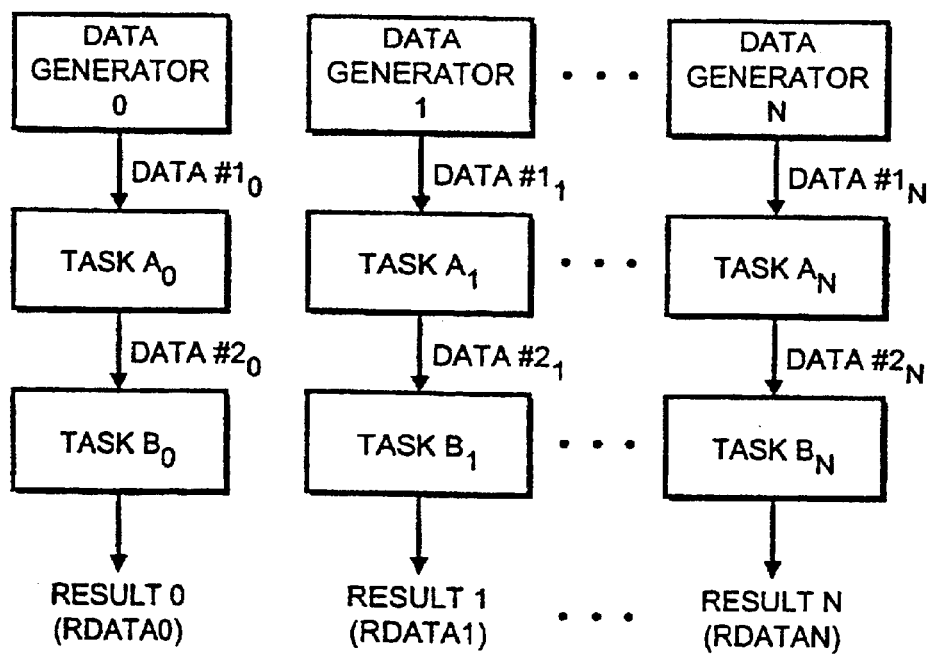

FIG. 37 illustrates another method embodying the present invention. In step A of FIG. 37 the queues are defined for each pixel, together with a single opaque depth value. Fragment data is received at step B, and if that fragment data is behind the current opaque depth value then it is discarded (step C), as before. In this third embodiment, visible data is then entered into the queue for a pixel at a location appropriate to its fragment depth value. If the fragment is opaque (step E) then the queue entries behind the new fragment data (i.e. with a lower depth value) are cleared (step F). The reception of fragment data continues if there are more fragments available (step G). As soon as all of the primitives have been processed, the queue contents are shaded and blended as before.

It will be appreciated that the method in accordance with FIG. 37 avoids the need for post-rasterisation sorting since the incoming fragments are effectively sorted when being loaded into the queue. The queue location is chosen on the basis of the fragment depth value, rather than simply the next available location, as in the other methods. The contents of the final queue for each pixel will contain an opaque primitive data location and a sorted list of transparent primitive data locations.

Figure 40:
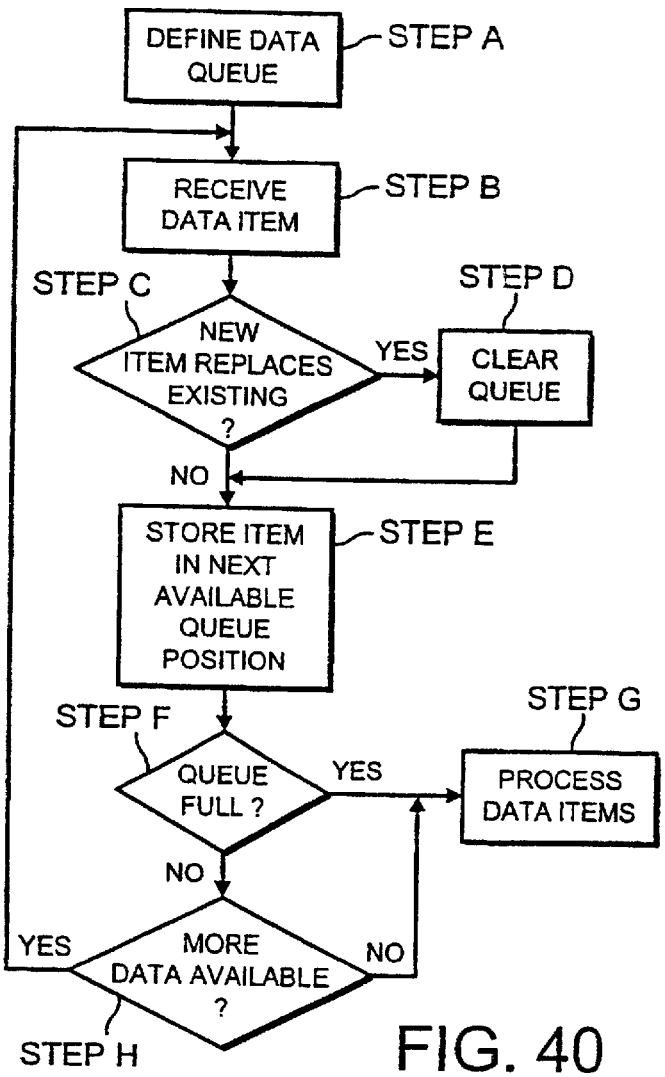
FIG. 40 illustrates a data processing technique embodying one aspect of the present invention.
Figure 41:
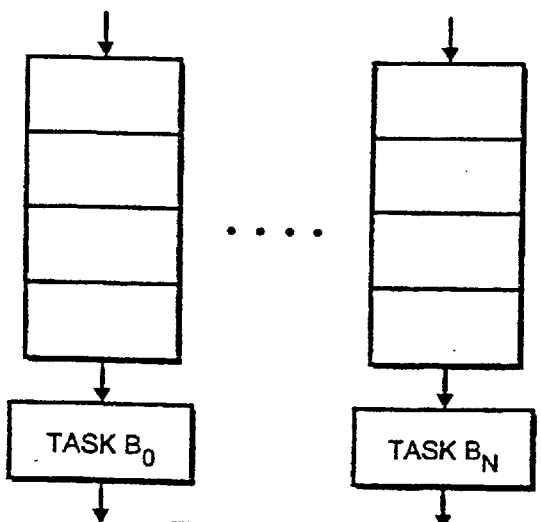
FIGS. 41, 42, 43, and 44 illustrate data queues in accordance with one aspect of the present invention.

FIG. 40 illustrates a method embodying the present invention, which will be explained with reference to that Figure and to FIGS. 41 to 44. In FIGS. 41 to 44, one set of tasks and related queues for a single processor are shown for the sake of clarity. It will be readily appreciated, however, that the definition of queues extends to many processors in a SIMD architecture.

Also, although the preferred embodiment is described in relation to at least one of the queues becoming full or no further data items being available before processing a successive task, it will be readily appreciated by a person skilled in the art that the successive task can be started upon other conditions being satisfied. For example, in response to all of the queues having at least one data item, in response to a proportion of the queues having at least one data item, by delaying the successive processing for a predetermined period of time, or after at least one of the queues has been filled to a predetermined level.

Figure 42:
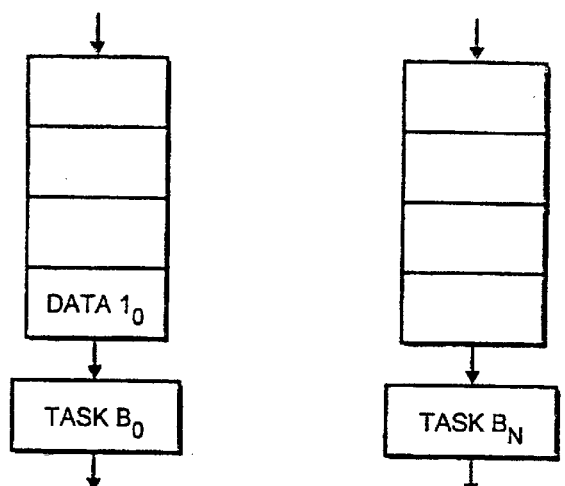
Figure 43:
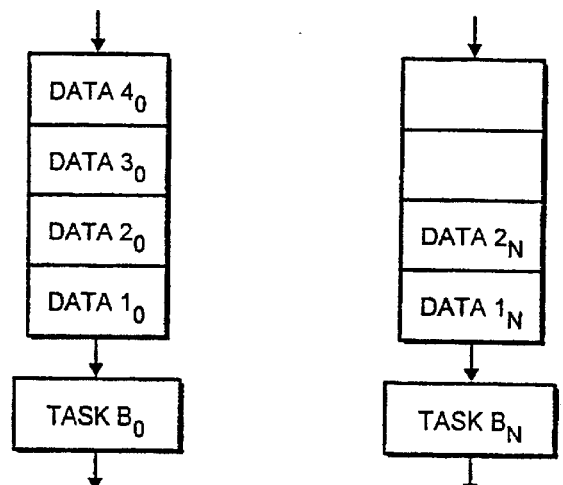

In step A of FIG. 40 a data queues is defined for each SIMD processing element. In step B data is received for processing by the processing element in accordance with Task A. Not all of the processing elements will receive data items at the same time, since the source of the data items depends on the task to be performed and on the previous processing stage. However, it could be expected that over a reasonable period of time, all of the elements would receive at least one data item. At step C, the new data item is examined to determine whether it can replace the data items currently stored in the queue for that element. If this is the case, then, at step D the queue is cleared. The new data item is stored in the next available queue position (step E), which will be the first position if the queue has been cleared, or the next available position if data is already stored in the queue. It is to be noted that data is stored in the queue in a first in first out manner. Storage of the first new data item is shown in FIG. 42. Assuming that the queue is not full (step F) and that there is more data available (step H) the process continues to receive new data items (steps B to E) until the queue is full or until no more data is available. A full queue is illustrated in FIG. 43.

Figure 44:
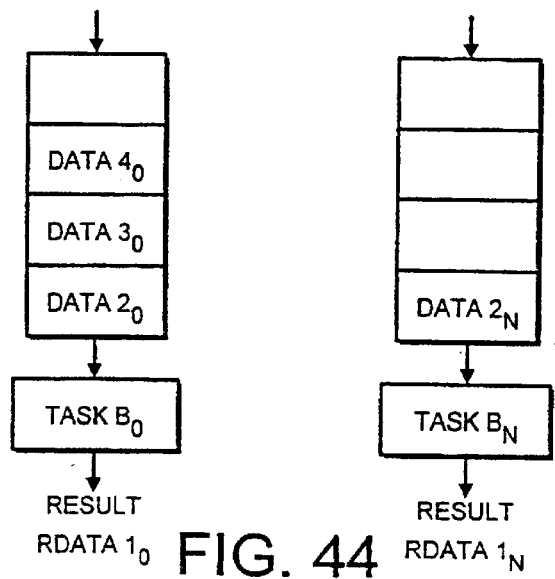

When data items are no linger received, the data stored in the queue is processed in a first in first out manner, i.e. The first data item to be stored in a queue is processed by Task A (step G). The result of the processing of the first data item by task A is supplied to the queue of Task B, as illustrated in FIG. 44.

It will be appreciated that with a multiple processor design using a SIMD architecture that the processing elements in the architecture will probably all have data to be processed by Task A by the time one of the data queues is full. This results in greater utilisation of the processors in the architecture.

Preferably, each processing element has a queue defined for each of a number of expected tasks. For example, if three tasks A, B and C are expected to be processed sequentially, three queues will be defined. It will therefore be appreciated that, with a queue present between sequential Tasks, it is not necessary to run Task B immediately after running each Task A. Instead, Task A can be run multiple times, until one or more of the Task B queues is filled. When one or more of the queues situated between Tasks A and B is filled, it is at that point when Task B is eventually allowed to run.

If the distribution of the expected data is approximately random, then, for a sufficiently deep queue, it would be expected that most, if not all, queues would contain at least one data entry by the time Task B is run. Every processing element would have data on which it can perform Task B. The result of introducing a queue results in a much higher utilisation of the available processing power and therefore overall processing efficiency. Such efficiency would tend toward 100%.

The principle of introducing a queue between successive Tasks can be extended to any number of cascaded tasks. When a queue becomes full and can no longer accept input data, the preceding Task ceases processing and the next successive Task is run.

This means that a method of identifying when at least one queue has been filled is provided in order to change the instructions being issued from the first Task (A) to instructions for running the second Task (B).

A further refinement of this process is to add some rules to each Task that is placing data into a queue so as to allow it to replace the current contents of the queue with a single new item. This effectively allows items which would otherwise have been processed by Task B to be eliminated after further items have been processed by Task A, but before the processing by Task B is performed.

By way of a practical example, the following now describes the computer graphics method of "deferred blending" in terms of the above principle.

Rasterising a primitive i.e. turning it from a geometric shape into a set of fragments, one per processor is Task A.

In an array of processing elements, some processing elements will have a fragment of the triangle and some will not. Those processing elements that do have fragment data can place it in the queue.

Shading and blending a fragment into the frame buffer is Task B. This is an expensive task, and it would not want to be performed when there would otherwise be low utilisation, i.e. low efficiency.

A fragment only ends up in the queue if it is in front of preceding fragments. A simple rule could be added indicating when to discard and not discard the contents of a queue. If a fragment is opaque, all previous entries in the queue can be discarded and a blended fragment does not trigger this rule.

As mentioned above, although the preferred embodiment refers to Task B being run when either one or more of the queues between Tasks A and B is filled or no other data items are available, other alternative embodiments also fall within the scope of the invention as defined in the appended claims. For example, the Task B could be run in response to all of the queues having at least one data item, in response to a proportion of the queues having at least one data item, by delaying Task B for a predetermined period of time after Task A, or after at least one of the queues has been filled to a predetermined level.

Figure 45:
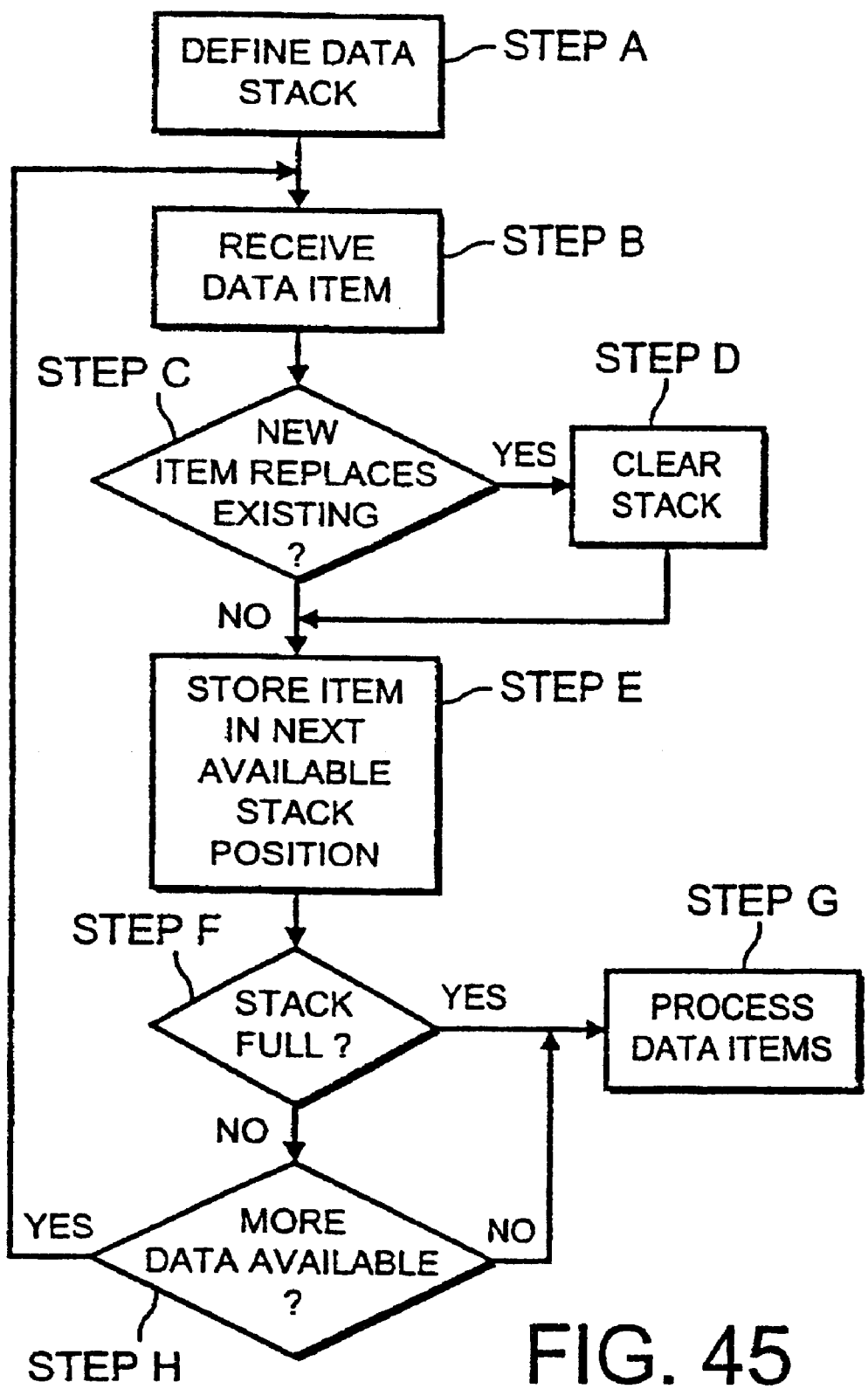
FIG. 45 illustrates a data processing technique embodying another aspect of the present invention.
Figure 46:
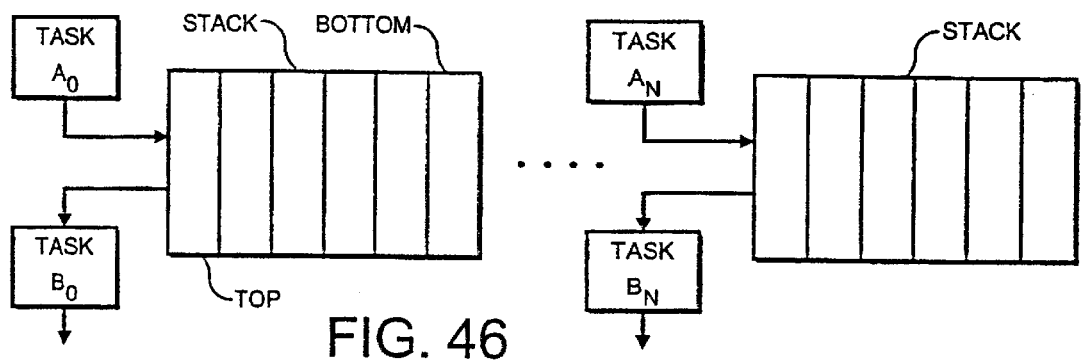
FIGS. 46, 47, 48 and 49 illustrate data stacks in accordance with one aspect of the present invention.

FIG. 45 illustrates another method embodying the present invention, which will be explained with reference to that Figure and to FIGS. 46 to 49. In FIGS. 46 to 49, one set of tasks and related stacks for a single processor are shown for the sake of clarity. It will be readily appreciated, however, that the definition of stacks extends to many processors in a SIMD architecture.

Also, although the preferred embodiment is described in relation to at least one of the stacks becoming full or no further data items being available before processing a successive task, it will be readily appreciated by a person skilled in the art that the successive task can be started upon other conditions being satisfied. For example, in response to all of the stacks having at least one data item, in response to a proportion of the stacks having at least one data item, by delaying the successive processing for a predetermined period of time, or after at least one of the stacks has been filled to a predetermined level.

Figure 47:
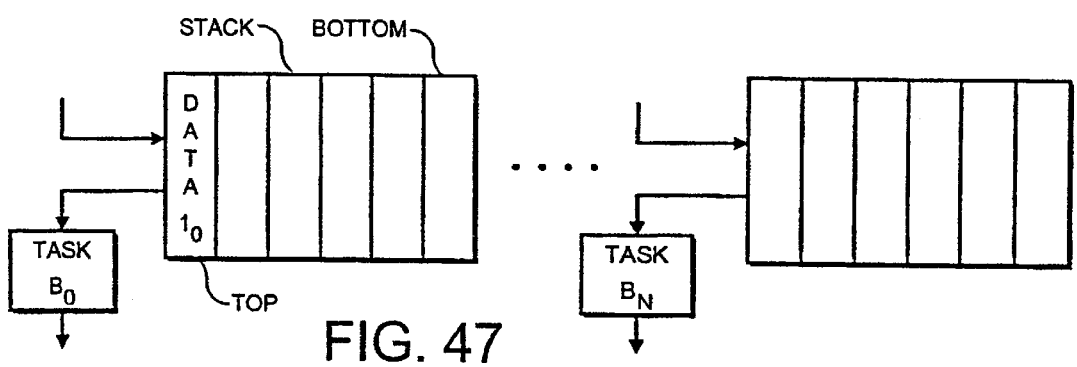
Figure 48:
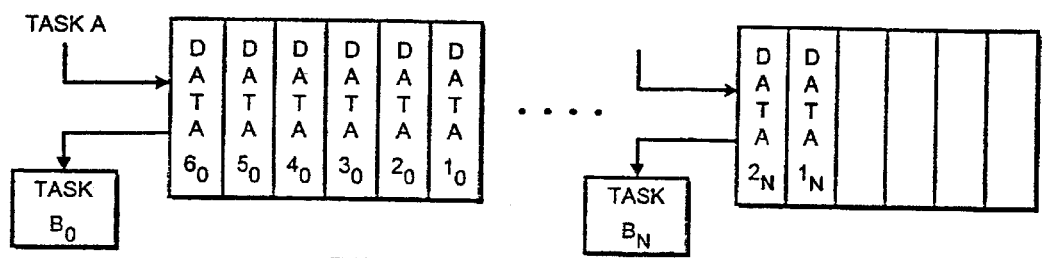

In step A of FIG. 45 a data stack is defined for each SIMD processing element. In step B data is received, having been processed in accordance with Task A. Not all of the processing elements will receive data items at the same time, since the source of the data items depends on the task to be performed and on the previous processing stage. However, it could be expected that over a reasonable period of time, all of the elements would receive at least one data item. At step C, the new data item is examined to determine whether it can replace the data items currently stored in the stack for that element. If this is the case, then, at step D the stack is cleared. The new data item is stored in the next available stack position (step E), which will be the first position if the stack has been cleared, or the next available position if data is already stored in the stack. It is to be noted that data is stored in the stack in a first-in-last-out manner. Storage of the first new data item DATA $1_0$ is shown in FIG. 47. Assuming that the stack is not full (step F) and that there is more data available (step H) the process continues to receive new data items DATA $2_0$, . . . , DATA $6_0$ (steps B to E) until the stack is full or until no more data is available. A full stack is illustrated in FIG. 48.

Figure 49:
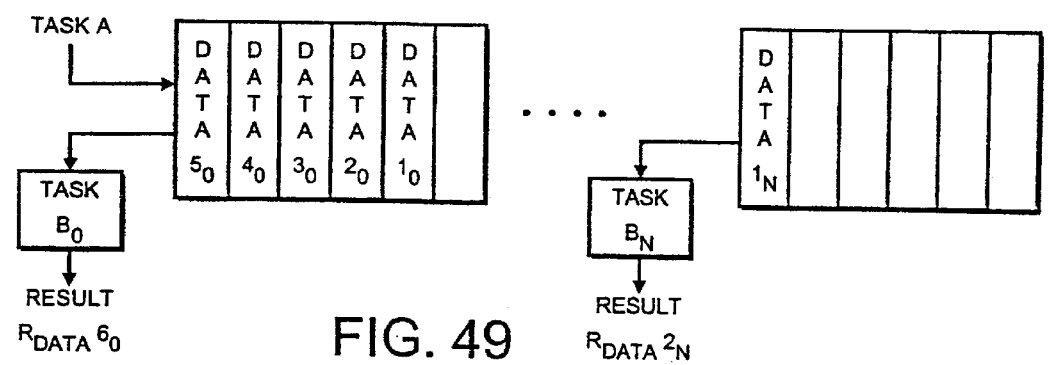

When data items are no longer received, the data stored in the stack is processed in a first-in-last-out manner, i.e. The last data item to be stored in the stack DATA $6_0$ is the last item processed by Task A (step G). This result of the processing of the last data item by task A is then supplied to Task B, as illustrated in FIG. 49.

It will be appreciated that with a multiple processor design using a SIMD architecture that the processing elements in the architecture will probably all have data to be processed by Task B by the time one of the data stacks is full. This results in greater utilisation of the processors in the architecture.

Preferably, each processing element has a stack defined for each of a number of expected tasks. For example, if three tasks A, B and C are expected to be processed sequentially, three stacks will be defined. It will therefore be appreciated that, with a stack present between sequential Tasks, it is not necessary to run Task B immediately after running each Task A. Instead, Task A can be run multiple times, until one or more of the Task B stacks is filled. When one or more of the stacks situated between Tasks A and B is filled, it is at that point when Task B is eventually allowed to run.

If the distribution of the expected data is approximately random, then, for a sufficiently deep stack, it would be expected that most, if not all, stacks would contain at least one data entry by the time Task B is run. Every processing element would have data on which it can perform Task B. The result of introducing a stack results in a much higher utilisation of the available processing power and therefore overall processing efficiency. Such efficiency would tend toward 100%.

The principle of introducing a stack between successive Tasks can be extended to any number of cascaded tasks. When a stack becomes full and can no longer accept input data, the preceding Task ceases processing and the next successive Task is run.

This means that a method of identifying when at least one stack has been filled is provided in order to change the instructions being issued from the first Task (A) to instructions for running the second Task (B).

A further refinement of this process is to add some rules to each Task that is placing data into a stack so as to allow it to replace the current contents of the stack with a single new item. This effectively allows items which would otherwise have been processed by Task B to be eliminated after further items have been processed by Task A, but before the processing by Task B is performed.

By way of a practical example, the following now describes an example of "code breaking" in terms of the above principle using a stack.

Assuming brute force code breaking, where "keys" are tested until the correct "key" i.e. the 'target key', is found and there are two processing steps available.

The first step is the cheaper of the two steps and this first step generates "keys", wherein with each step a "key" is created with a higher probability of being the desired "target key" and the second step is an expensive step that determines if the "target key" has been found. The cheaper step or task will be Task A and the more expensive step or task will be Task B.

Task A is run multiple times and on each iteration, each PE will either generate a "new key" or "no key". When a "key" is generated it is "pushed" onto the top of the stack. When the condition for running step B is met, the top data item (i.e. the last data item in) on each stack is taken off the stack, i.e. "popped", and processed. This top data item (the last one in) will be the one with the highest probability of being the "target key" (the first one out).

If the "target key" is not found, another Task B will need to be run.

The use of a stack between Tasks increases the utilisation of the processing elements, and the stack allows the most "likely keys" to be processed by Step A first.

It will be appreciated that the references above to first-in-last-out are analogous to last-in-first-out.

As mentioned earlier, although the preferred embodiment refers to Task B being run when either one or more of the stacks between Tasks A and B is filled or no other data items are available, other alternative embodiments also fall within the scope of the invention as defined in the appended claims. For example, the Task B could be run in response to all of the stacks having at least one data item, in response to a proportion of the stacks having at least one data item, by delaying Task B for a predetermined period of time after Task A, or after at least one of the stacks has been filled to a predetermined level.

What is claimed is:

1. A method of processing data items in a single instruction multiple data (SIMD) processing architecture having a plurality of processing elements for processing data, the method comprising:
   for each processing element defining a data queue having a plurality of queue positions;
   receiving a new data item for at least one processing element in the architecture;
   storing the data item in the next available queue position in the queue defined for the processing element concerned;
   receiving and storing further data items until a predetermined condition is met; and
   processing the first data item in each queue using the associated processing element, all of the processing element operating according to the same single instruction, thereby producing respective result data items.

2. A method as claimed in claim 1, wherein the predetermined condition comprises either no further data items being available or a predetermined queue status being met.

3. A method as claimed in claim 2, wherein the predetermined queue status relates to at least one of the queues becoming full.

4. A method as claimed in claim 2, wherein the predetermined queue status relates to all of the data queues having at least one data item.

5. A method as claimed in claim 2, wherein the predetermined queue status relates to a proportion of the queues having at least one data item.

6. A method as claimed in claim 1, wherein the received data item is examined to determine whether it replaces data items already stored in the queue concerned, and if so clearing the queue before storing that new data item.

7. A method as claimed in claim 1, wherein respective queues are defined for a plurality of processing tasks for each processing element.

8. A method as claimed in claim 7, wherein result data items produced by one task are supplied to a queue defined for a further task.

9. A method as claimed in claim 8, wherein the further task is processed by the processing elements in the array when the queue for that task is full.

10. A data processing apparatus for processing data items in a single instruction multiple data (SIMD) processing architecture having a plurality of processing elements for processing data, the apparatus comprising:
    a data queue corresponding to each processing element, the data queue having a plurality of queue positions;
    means for receiving a new data item for at least one processing element in the architecture;
    means for storing the data item in the next available queue position in the queue defined for the processing element concerned;
    means for receiving and storing further data items until a predetermined condition is met; and
    means for processing the first data item in each queue using the associated processing element, all of the processing element operating according to the same single instruction, thereby producing respective result data items.

11. A method of processing data items in a single instruction multiple data (SIMD) processing architecture having a plurality of processing elements for processing data, the method comprising:
    for each processing element defining a data stack having a plurality of stack positions;
    receiving a new data item for at least one processing element in the architecture;
    storing the data item in the next available stack position in the stack defined for the processing element concerned;
    receiving and storing further data items until a predetermined condition is met; and
    processing the last data item in each stack using the associated processing element, all of the processing element operating according to the same single instruction, thereby producing respective result data items.

12. A method as claimed in claim 4, wherein the predetermined condition comprises either no further data items being available or a predetermined stack status being met.

13. A method as claimed in claim 12, wherein the predetermined stack status relates to at least one of the stacks becoming full.

14. A method as claimed in claim 12, wherein the predetermined stack status relates to all of the data stacks having at least one data item.

15. A method as claimed in claim 12, wherein the predetermined stack status relates to a proportion of the stacks having at least one data item.

16. A method as claimed in claim 11, wherein the received data item is examined to determine whether it replaces data items already stored in the stack concerned, and if so clearing the stack before storing that new data item.

17. A method as claimed in claim 11, wherein respective stacks are defined for a plurality of processing tasks for each processing element.

18. A method as claimed in claim 17, wherein result data items produced by one task are supplied to a stack defined for a further task.

19. A method as claimed in claim 18, wherein the further task is processed by the processing elements in the array when the stack for that task is full.

20. A data processing apparatus for processing items in a single instruction multiple data (SIMD) processing architecture having a plurality of processing elements for processing data, the apparatus comprising:
    a data stack corresponding to each processing element, each stack having a plurality of stack positions;
    means for receiving a new data item for at least one processing element in the architecture;
    means for storing the data item in the next available stack position in the stack corresponding to the processing element concerned;
    means for receiving and storing further data items until a predetermined condition is met; and
    means for processing the last data item in each stack using the associated processing element, all of the processing elements operating according to the same single instruction, thereby producing respective result data items.

21. A data processing apparatus as claimed in claim 20, wherein the predetermined condition comprises either no further data items being available or a predetermined stack status being met.

22. A data processing apparatus as claimed in claim 21, wherein the predetermined stack status relates to at least one of the stacks becoming full.

23. A data processing apparatus as claimed in claim 21, wherein the predetermined stack status relates to all of the data stacks having at least one data item.

24. A data processing apparatus as claimed in claim 21, wherein the predetermined stack status relates to a proportion of the stacks having at least one data item.

* * * * *